(12) United States Patent
Galitsky

(10) Patent No.: US 11,914,965 B2
(45) Date of Patent: Feb. 27, 2024

(54) FORMULATING QUESTIONS USING DIFFERENCES BETWEEN SETS OF SYNTACTIC TREES AND DIFFERENCES BETWEEN SETS OF SEMANTIC TREES

(71) Applicant: Oracle International Corporation, Redwood Shores, CA (US)

(72) Inventor: Boris Galitsky, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 409 days.

(21) Appl. No.: 17/389,914

(22) Filed: Jul. 30, 2021

(65) Prior Publication Data

US 2022/0075954 A1 Mar. 10, 2022

Related U.S. Application Data

(60) Provisional application No. 63/074,778, filed on Sep. 4, 2020.

(51) Int. Cl.
| | |
|---|---|
| *G06F 40/30* | (2020.01) |
| *G06F 16/28* | (2019.01) |
| *G06F 16/31* | (2019.01) |
| *G06F 16/332* | (2019.01) |
| *G06F 16/36* | (2019.01) |

(52) U.S. Cl.
CPC ............ *G06F 40/30* (2020.01); *G06F 16/288* (2019.01); *G06F 16/322* (2019.01); *G06F 16/3329* (2019.01); *G06F 16/367* (2019.01)

(58) Field of Classification Search
None
See application file for complete search history.

(56) References Cited

U.S. PATENT DOCUMENTS

| | | | |
|---|---|---|---|
| 10,649,985 B1 * | 5/2020 | Cornell, Jr. | G06F 16/9024 |
| 11,567,907 B2 * | 1/2023 | Glover | G06F 16/93 |

(Continued)

OTHER PUBLICATIONS

"Mozenda—Scalable Web Data Extraction Software & Services", Available Online at: http://mozenda.com/, Accessed from internet on Jul. 10, 2020, 4 pages.

(Continued)

*Primary Examiner* — Paras D Shah
*Assistant Examiner* — Nicole A K Schmieder
(74) *Attorney, Agent, or Firm* — Kilpatrick Townsend & Stockton LLP

(57) ABSTRACT

Disclosed systems relate to generating questions from text. In an example, a method includes forming a first semantic tree from a first reference text and second semantic tree from a second reference text. The method includes identifying a set of semantic nodes that are in the first semantic tree but not in the second semantic tree. The method includes forming a first syntactic tree for the first reference text and a second syntactic tree for the second reference text. The method includes identifying a set of syntactic nodes that are in the first syntactic tree but not in the second syntactic tree. The method includes mapping the set of semantic nodes to the set of syntactic nodes by identifying a correspondence between a semantic node and a syntactic node, forming a question fragment from a normalized word, and providing the question fragment to a user device.

20 Claims, 10 Drawing Sheets

(56) References Cited

U.S. PATENT DOCUMENTS

| | | | |
|---|---|---|---|
| 2015/0057991 A1* | 2/2015 | Mesheryakov | G06F 40/268 704/9 |
| 2018/0260472 A1* | 9/2018 | Kelsey | G06F 40/56 |
| 2021/0294827 A1* | 9/2021 | Sunagawa | G06F 16/215 |

OTHER PUBLICATIONS

Apt et al., "Towards a Theory of Declarative Knowledge", In Foundations of Deductive Databases and Logic Programming, 1988, pp. 89-148.

Baskaran et al., "Automated Scraping of Structured Data Records From Health Discussion Forums Using Semantic Analysis", Informatics in Medicine Unlocked, vol. 10, 2018, pp. 149-158.

Becerra-Bonache et al., "Relational Grounded Language Learning", ECAI 2016—22nd European Conference on Artificial Intelligence, 2016, pp. 1764-1765.

Cerna et al., "A Generic Framework for Higher-Order Generalizations", 4th International Conference on Formal Structures for Computation and Deduction (FSCD 2019), Article No. 10, 2019, pp. 10:1-10:19.

Crescenzi et al., "Roadrunner: Automatic Data Extraction From Data-intensive Websites", Conference: Proceedings of the 2002 ACM SIGMOD International Conference on Management of Data, Jan. 2002, 1 page.

Dagan et al., "Recognizing Textual Entailment: Models and Applications", Morgan and Claypool Publishing, 2013, pp. 157-160.

De La Higuera et al., "On Sets of Terms: A Study of a Generalisation Relation and of its Algorithmic Properties", Fundamenta Informaticae, vol. 25, No. 2, Available Online at: https://www.researchgate.net/publication/220443825_On_Sets_of_Terms_A_Study_of_a_Generalisation_Relation_and_of_Its_Algorithmic_Properties/link/5405d51d0cf2bba34c1db45b/download, Feb. 1996, 23 pages.

Dreisbach et al., "A Systematic Review of Natural Language Processing and Text Mining of Symptoms From Electronic Patient-Authored Text Data", International Journal of Medical Informatics, vol. 125, 2019, pp. 37-46.

Du et al., "Learning to Ask: Neural Question Generation for Reading Comprehension", In ACL, Available Online at: https://arxiv.org/pdf/1705.00106.pdf, Apr. 29, 2017, 11 pages.

Galitsky, "Finding a Lattice of Needles in a Haystack: Forming a Query from a Set of Items of Interest", FCA4AI'15: Proceedings of the 4th International Conference on What can FCA do for Artificial Intelligence?—vol. 1430, Available Online at: https://dl.acm.org/doi/10.5555/2907112.2907123, Jul. 2015, pp. 99-106.

Galitsky et al., "From Generalization of Syntactic Parse Trees to Conceptual Graphs", International Conference on Conceptual Structures, 2010, pp. 185-190.

Galitsky et al., "Matching Sets of Parse Trees for Answering Multi-Sentence Questions", Proceedings of the Recent Advances in Natural Language Processing, RANLP 2013, Sep. 2013, pp. 285-293.

Ganter et al., "Pattern Structures and Their Projections", 9th International Conference on Conceptual Structures (ICCS 2001), Lecture Notes in Artificial Intelligence (Springer), vol. 2120, Jul. 2001, pp. 129-142.

Gao et al., "Difficulty Controllable Question Generation for Reading Comprehension", International Joint Conference on Artificial Intelligence, 2019, pp. 4968-4974.

Ha et al., "Automatic Distractor Suggestion for Multiple-Choice Tests Using Concept Embeddings and Information Retrieval", Proceedings of the Thirteenth Workshop on Innovative Use of NLP for Building Educational Applications, Available Online at: https://aclanthology.org/W18-0548.pdf, Jun. 5, 2018, pp. 389-398.

Heilman et al., "Good Question! Statistical Ranking for Question Generation", In HLT-NAACL, Available Online at: https://aclanthology.org/N10-1086.pdf, Jun. 2010, pp. 609-617.

Kumar et al., "Automating Reading Comprehension by Generating Question and Answer Pairs", In PAKDD, Available Online at: https://arxiv.org/pdf/1803.03664.pdf, Mar. 7, 2018, pp. 1-12.

Kuper et al., "Efficient Parallel Algorithms for Anti-Unification and Relative Complement", Available Online at: 10.1109/LICS.1988.5109, Aug. 1988, pp. 112-120.

Kurdi et al., "A Systematic Review of Automatic Question Generation for Educational Purposes", International Journal of Artificial Intelligence in Education, vol. 30, 2020, pp. 121-204.

Kuznetsov, "Fitting Pattern Structures to Knowledge Discovery in Big Data", Proc. 11th International Conference on Formal Concept Analysis (ICFCA 2013), Lecture Notes in Artificial Intelligence (Springer), vol. 7880, 2013, pp. 254-266.

Kuznetsov, "Scalable Knowledge Discovery in Complex Data with Pattern Structures", Proc. 5th International Conference Pattern Recognition and Machine Intelligence (PReMI'2013), Lecture Notes in Computer Science (Springer), vol. 8251, Dec. 2013, pp. 30-41.

Leo et al., "Ontology Based Generation of Medical, Multi-Term MCQs", International Journal of Artificial Intelligence in Education, vol. 29, Jan. 25, 2019, pp. 145-188.

Lixto, "Periscope by McKinsey", Available Online at: http://www.lixto.com/, Accessed from internet on Jul. 10, 2020, 9 pages.

Ourioupina et al., "Application of Default Reasoning to Semantic Processing Under Question—Answering", DIMACS Tech Report, vol. 16, May 2001, pp. 1-22.

Plotkin, "A Note on Inductive Generalization", Department of Machine Intelligence and Perception, vol. 5, No. 1, 1970, pp. 153-163.

Sinha et al., "CLUTRR: A Diagnostic Benchmark for Inductive Reasoning from Text", In EMNLP, Available Online at: https://arxiv.org/pdf/1908.06177.pdf, Sep. 4, 2019, 22 pages.

Song et al., "Leveraging Context Information for Natural Question Generation", In NAACL-HLT, Available Online at: https://aclanthology.org/N18-2090.pdf, Jun. 1-6, 2018, pp. 569-574.

Sowa et al., "Knowledge Representation: Logical, Philosophical, and Computational Foundations", Brooks Cole Publishing Co., Jan. 2000, pp. 287-294.

Wang et al., "Better AMR-to-Text Generation with Graph Structure Reconstruction", Proceedings of the Twenty-Ninth International Joint Conference on Artificial Intelligence IJCAI, Available Online at: https://doi.org/10.24963/ijcai.2020/542, 2020, pp. 3919-3925.

Yao et al., "Semantics-Based Question Generation and Implementation", Dialogue & Discourse, vol. 3, No. 2, 2012, pp. 11-42.

Yuan et al., "Machine Comprehension by Text-to-Text Neural Question Generation", Proceedings of the 2nd Workshop on Representation Learning for NLP, Available Online at: https://aclanthology.org/W17-2603.pdf, Aug. 3, 2017, pp. 15-25.

Zhou et al., "Neural Question Generation from Text: A Preliminary Study", In NLPCC, Available Online at: https://arxiv.org/pdf/1704.01792.pdf, Apr. 18, 2017, 6 pages.

Alsubait et al., Next Generation of E-Assessment: Automatic Generation of Questions, International Journal of Technology Enhanced Learning, vol. 4, Nos. 3-4, Jan. 2012, pp. 156-171.

Becerra-Bonache et al., A First-Order-Logic Based Model for Grounded Language Learning, Advances in Intelligent Data Analysis XIV, vol. 9385, 2015, pp. 49-60.

Galitsky, Improving Relevance in a Content Pipeline via Syntactic Generalization, Engineering Applications of Artificial Intelligence, vol. 58, Feb. 2017, pp. 1-26.

Galitsky, Narrative Generation for the Control of Buyer's Impression, Symposium on Artificial Intelligence and Creative Language, 1999.

Galitsky, Natural Language Question Answering System: Technique of Semantic Headers, Advanced Knowledge International, 2003.

Michalski, A Theory and Methodology of Inductive Learning, Artificial Intelligence, vol. 20, 1983, pp. 111-163.

Schulz et al., Practical Web Data Extraction: Are We There Yet?—A Short Survey, In: IEEE/WIC/ACM International Conference on Web Intelligence, IEEE Computer Society, Oct. 2016, pp. 13-16.

Sleiman et al., Trinity: On Using Trinary Trees for Unsupervised Web Data Extraction, IEEE Transactions on Knowledge and Data Engineering, vol. 26, No. 6, Jun. 2014, pp. 1544-1556.

(56) References Cited

OTHER PUBLICATIONS

Varlamov et al., "A Survey of Methods for the Extraction of Information From WebResources", Program Computer Software, vol. 42, No. 5, Sep. 2016, pp. 279-291.

* cited by examiner

FORMULATING QUESTIONS USING DIFFERENCES BETWEEN SETS OF SYNTACTIC TREES AND DIFFERENCES BETWEEN SETS OF SEMANTIC TREES

CROSS-REFERENCES TO RELATED APPLICATIONS

This application claims the benefit of U.S. Provisional Application No. 63/074,778 filed Sep. 4, 2020, the contents of which is hereby incorporated by reference in its entirety.

TECHNICAL FIELD

This disclosure is generally concerned with linguistics. More specifically, this disclosure relates to using semantic and syntactic techniques to perform textual analysis and question generation.

BACKGROUND

Linguistics is the scientific study of language. One aspect of linguistics is the application of computer science to human natural languages such as English. Due to the greatly increased speed of processors and capacity of memory, computer applications of linguistics are on the rise. For example, computer-enabled analysis of language discourse facilitates numerous applications such as automated agents that can answer questions from users. But many existing solutions are unable to fully leverage semantic and syntactic aspects of language, resulting in inferior question generation systems and other downstream applications.

BRIEF SUMMARY

Generally, systems, devices, and methods of the present invention are related to question generation systems.

In an aspect, a method of generating questions from text includes forming a first semantic tree from a first reference text and second semantic tree from a second reference text. Each semantic tree includes nodes and edges. Each node represents a role of a corresponding entity. Each edge represents a relationship between two of the entities. The method further includes identifying, from the first semantic tree and the second semantic tree, a set of semantic nodes that are (i) in the first semantic tree and (ii) not in the second semantic tree. The method further includes forming a first syntactic tree for the first reference text and a second syntactic tree for the second reference text. Each syntactic tree includes terminal nodes that represent words and syntactic nodes that represent syntactic categories. The method further includes identifying, from the first syntactic tree and the second syntactic tree, a set of syntactic nodes that are in the first syntactic tree but not in the second syntactic tree. The method further includes mapping the set of semantic nodes to the set of syntactic nodes by identifying a correspondence between a first node in the set of semantic nodes and a second node in the set of syntactic nodes. The first node and the second node are associated with an identical normalized word. The method further includes forming a question fragment from the normalized word. The method further includes providing the question fragment to a user device.

In a further aspect, identifying the set of semantic nodes includes identifying, between the first semantic tree and the second semantic tree, a semantic maximal common subtree that includes a maximum number of nodes, each node representing a common entity that is common between the first semantic tree and the second semantic tree and edges between the nodes that represent a semantic relationship between the two or more of the common entities. Identifying the set of semantic nodes includes removing, from the first semantic tree, nodes that are in the semantic maximal common subtree.

In a further aspect, identifying the set of syntactic nodes includes identifying, from the first syntactic tree and the second syntactic tree, a syntactic maximal common subtree that includes a maximum number of nodes, each node representing a common entity that is common between the first syntactic tree and the second syntactic tree, and parent nodes that represent a syntactic category of one or more of the nodes. Identifying the set of syntactic nodes further includes removing, from the first syntactic tree, nodes that are in the syntactic maximal common subtree.

In a further aspect, forming a question fragment includes identifying that the normalized represents either (i) a noun, (ii) a verb, (iii) adjective, or (iv) adverb; and replacing the word with a question word, wherein a question word is one of (i) what, (ii) where, (iii) whom, (iv) who, or (v) how.

In a further aspect, identifying that the normalized word represents either a noun, a verb, an adjective, or an adverb includes constructing an additional syntactic tree from one or more of text associated with the normalized word, the set of semantic nodes, and the set of syntactic nodes, wherein the additional syntactic tree comprises additional nodes.

In a further aspect, forming the question fragment includes extracting a candidate question fragment from text associated with the normalized word. Forming the question fragment further includes identifying a level of similarity between the candidate question fragment and a text fragment template. Forming the question fragment includes, responsive to determining that the level of similarity is greater than a threshold, identifying the candidate question fragment as the question fragment.

In a further aspect, the method further includes receiving, from the user device, a response to the question fragment and updating an entry in an ontology based on the response.

The above methods can be implemented as tangible computer-readable media and/or operating within a computer processor and attached memory.

DETAILED DESCRIPTION

Figure 1:
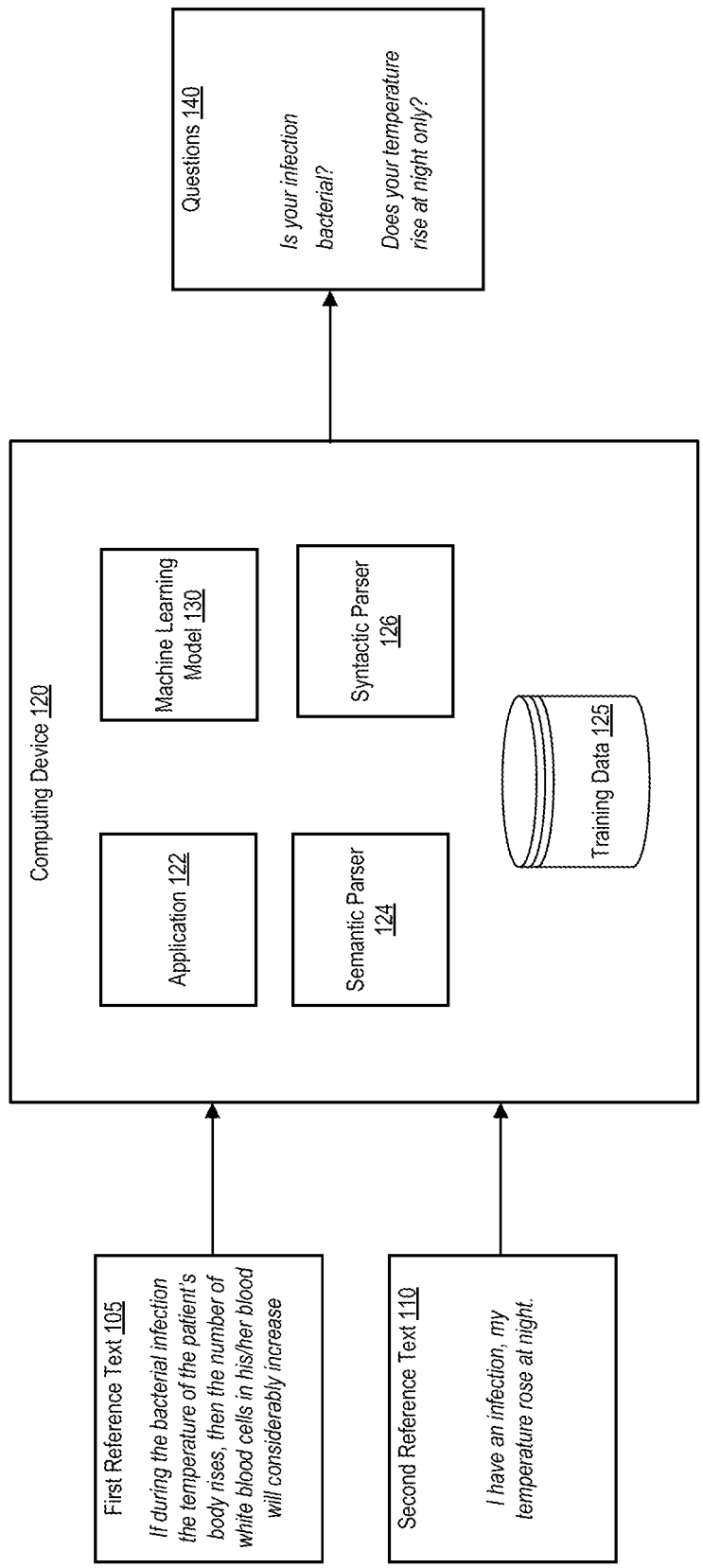
FIG. 1 depicts an exemplary question generation environment, in accordance with an aspect.

Aspects disclosed herein provide technical improvements to the area of computer-implemented linguistics. In particular, disclosed systems employ semantic and syntactic techniques to automatically generate questions that are targeted to solicit answers that augment or complete information in a reference text. Disclosed solutions therefore increase the accuracy and usefulness of computer-based question and answer systems, search systems, and other applications.

Some existing approaches fall into the following groups syntax-based, semantic-based, template-based, rule-based, and schema-based. Syntax-based approaches operate on the syntactic tree of text to generate questions. Semantic-based approaches rely on a deeper level of text understanding. Template-based algorithms use templates consisting of fixed text and some placeholders that are populated from the input. The main characteristic of rule-based approaches is the use of rule-based knowledge sources to generate questions that assess understanding of the important rules of the domain. As this definition implies that these methods require a deep understanding (beyond syntactic understanding), template-based approaches arguably fall under the semantic-based category. Schema-based systems are similar to templates but are more abstract, aggregating templates that represent variants of the same problem.

But existing solutions are focused on generating questions from text. This approach does not seek to improve robustness and completeness of a reference text or database. By contrast, disclosed techniques employ syntactic and semantic approaches to yield not only improved generated questions but also an identification of questions that when augmented, will augment a reference text. These questions obtain information that is outside of the text and as such can be used to classify or make a decision for this text. For instance, by identifying a discrepancy between what information is available and what information is needed, disclosed techniques formulate questions such that the obtained answers provide needed information.

The following non-limiting example is introduced for discussion purposes. An application accesses a first reference text (e.g., a knowledge base) and a second reference text (e.g., new information). The application forms, for reach reference text, a syntactic tree and a semantic tree. From the generated syntactic and semantic trees, the application identifies nodes that represent information that is in the second reference text but not in the first reference text. From these identified nodes, the application forms questions, that when answered, augment or complete knowledge in the second reference text.

Applications of these techniques include medical diagnostics. For example, in some automated applications, developing questions and obtaining a response is useful for formal procedures such as diagnosis. Therefore, these approaches can improve the meaningfulness of questions and overall accuracy of the resultant health diagnostics.

FIG. 1 depicts an exemplary question generation environment 100 in accordance with an aspect. FIG. 1 depicts a first reference text 105, a second reference text 110, computing device 120, and questions 140. In the example depicted, computing device 120 accesses first reference text 105 and second reference text 110 and uses syntactic and/or semantic techniques to generate questions 140.

Computing device 120 includes application 122, semantic parser 124, syntactic parser 126, training data 125, and machine learning model 130. Examples of computing devices include client computing devices 702, 704, 706, and 708 and cloud computing device 802 client devices 804, 806, 808 depicted in FIGS. 7 and 8 respectively.

Application 122 can cause semantic parser 124 to create one or more semantic trees from input text, e.g., the first reference text 105 or the second reference text 110. For example, semantic parser 124 can create a first semantic tree from first reference text 105 and a second semantic tree from the second reference text 110. Application 122 can cause syntactic parser 126 to can create one or more syntactic trees from input text, e.g., the first reference text 105 or the second reference text 110. For example, semantic parser 124 can create a first syntactic tree from first reference text 105 and a second syntactic tree from the second reference text 110.

Machine learning model 130 can be any kind of predictive model such a classifier, decision tree, neural network, etc. Machine learning model 130 can be trained using training data 125. Training data 125 can include training pairs, each including input data to be provided to the machine learning model 130 and an expected classification. During training, the expected classification is compared to a generated classification and one or more parameters of the classification model are adjusted to minimize loss. Machine learning model 130 can be used to generate syntactic trees or identify common nodes of two syntactic trees.

Application 122 uses semantic parser 124 to generate semantic trees from the first reference text 105 and the second reference text 110. From the semantic and/or syntactic trees, application 122 forms questions that can be used to augment knowledge not present in one of the texts (e.g., a second reference text 110) that is present in the other reference text (e.g., first reference text 105). In the example depicted, the first reference text 105 is as follows:
If during the bacterial infection the temperature of the patient's body rises, then the number of white blood cells in his/her blood will considerably increase.

The second reference text 110 is as follows:
I have an infection, my temperature rises at night.

Using syntactic and semantic techniques, application 122 generates the following questions 140:
Is your infection bacterial?
Does your temperature rise at night only?

Figure 6:
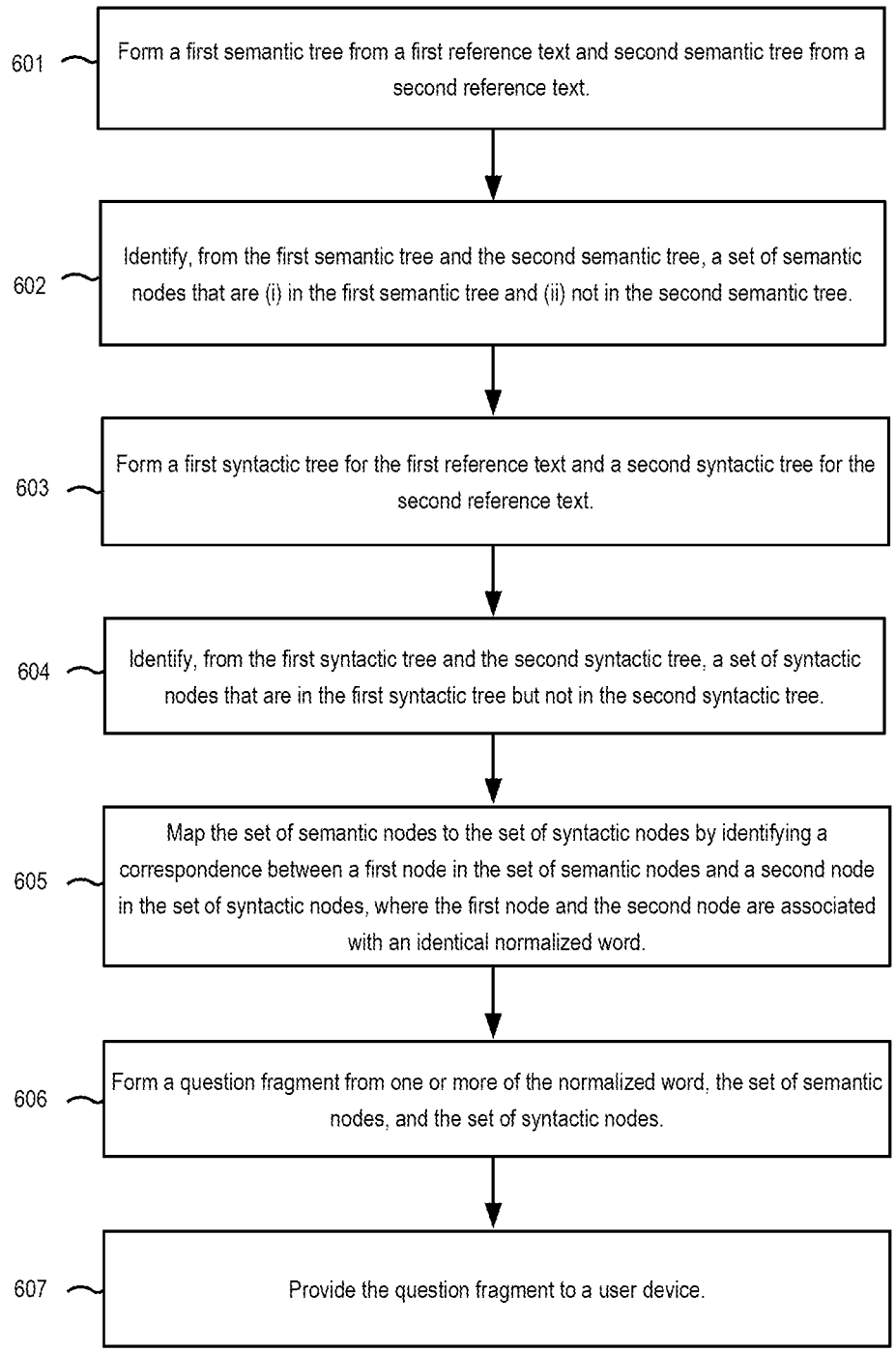
FIG. 6 depicts an exemplary process for generating questions from text, in accordance with an aspect.

An example of a process for generating questions is discussed further with respect to FIG. 6. The generated questions 140 can then be used to augment or complete information in the second reference text 110. When questions 140 are answered, supplemental information is obtained such that the second reference text is complete. Given that this example is in the medical domain, the completion represents a full description of the medical problem presented being available.

Figure 2:
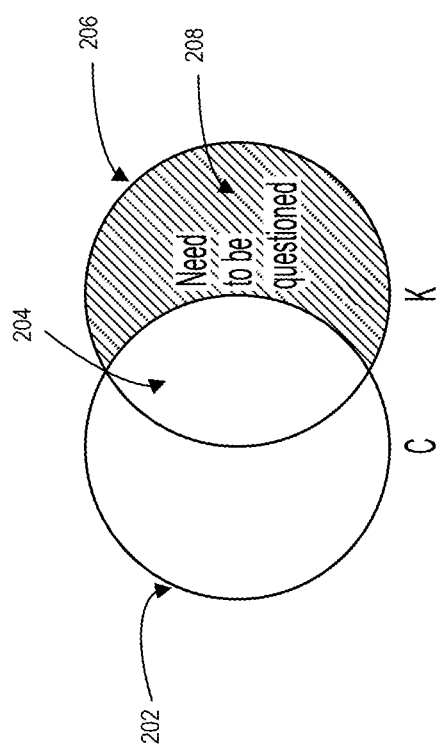
FIG. 2 depicts a semantic tree representing information for which questions can be generated, in accordance with an aspect of the present disclosure.

FIG. 2 depicts a semantic tree representing information for which questions can be generated, in accordance with an aspect of the present disclosure. FIG. 2 depicts case information (C) 202 (e.g. a first reference text) and knowledge (K) 206 (e.g. a second reference text). Information 204 represents information that is common between case information (C) 202 and knowledge (K) 206. As explained further herein, information 204 can be derived, for example, by using one or more maximally common subtrees. Information 208 represents information that needs to be questioned. Information 208 is present in knowledge (K) 206 but is not present in case information C. However, even when identified as present in a subset of knowledge (K) 206, information 208 may be incomplete.

Disclosed techniques generate questions that can be viewed as information that needs to be added to C to cover K. To satisfy a condition of a rule from K, which is not included in C before questions Qs are asked, the topics of these questions are determined, the questions are formulated, and when answers are obtained, K is fully complemented and rules from K can be applied to make a diagnosis.

In the medical domain, C can represent a doctor's knowledge (including reference texts) and K represents what a patient is telling the doctor. For instance, a doctor attempting to diagnose or treat a patient with a medical condition may have some background knowledge C. The patient provides additional information K. But K is incomplete. Disclosed solutions formulate questions that when answered, result in supplemental information being obtained such that a full description of treatment to the medical problem is present.

A question problem (Qs) can be formulated as follows. If K|–C then Qs is empty. In many cases, case description is limited, or knowledge is limited, so there is not enough evidence concerning K|–C. Hence there is a need for questions Qs such that once they are answered (their variables are instantiated), K+instantiated(Qs)|–C. In other words, once missing information instantiated(Qs is acquired via critical questions, knowledge K should be able to cover (explain, provide argument for) C. Qs is a minimal set of formal representation for questions satisfying this condition. For a practical application, questions are formed in natural language, $Q_{NLS}$.

Some examples of K and C:
1) K is an IF part of a rule. To make a rule applicable, missing information is acquired by questions.
2) K is how something is expected (how an illness is described in a literature), and C is something a patient is describing about how she is experiencing a disease. $Q_{NLS}$ is then a series of questions "Why is $t_K$ is different from $t_C$?" for each symptom t from the difference between K and C.
3) K and C are two texts. A difference between the texts is identified and converted into questions. If these two texts are associated with two different classes, answering these questions would relate a given situation into either class.

Hence Qs can be viewed as a logical subtraction of K from C: the target of the questions is the part of C which is not covered by K. Notice the difference with a general question generation problem.

Question generation techniques emerged as a solution to the challenges facing test developers in constructing a large number of good quality questions. Question generation is concerned with the construction of algorithms for producing questions from knowledge sources, which can be either structured (e.g. knowledge bases or unstructured (e.g. text)). Questions can be generated for validation of knowledge bases, development of conversational agents, and development of question answering or machine reading comprehension systems, where questions are used for training and testing.

Disclosed techniques can be employed in different application areas. For instance, learning, understanding and applying the laws of logic, both classical and non-classical, is helpful to work efficiently in the world of medicine. It allows one to effectively, consistently and without mistakes carry out all the reasoning and to prove the hypothesis in a formal way. Deducing important questions that need to be answered and forming conjectures from the obtained answers is an important part of the overall spectrum of reasoning tasks in healthcare domain.

Additionally, in education, question generation can reduce the cost (in terms of both money and effort) of question construction which, in turn, enables medical educators to spend more time on other important instructional activities. In addition to resource saving, having a large number of good-quality questions enables the enrichment of the medical teaching process with additional activities such as adaptive testing, which aims to adapt learning to student knowledge and needs, as well as drill and practice exercises. Finally, being able to automatically control question characteristics, such as question difficulty and cognitive level, can inform the construction of good quality tests with particular requirements.

There exist publicly available knowledge bases (KB) that are employed in different tasks such as text annotation and distractor generation. Medical case-based questions corpus can include more than four hundred case-based, auto-generated questions that follow the following patterns: ("What is the most likely diagnosis?", "What is the drug of choice?", "What is the most likely clinical finding?", and "What is the differential diagnosis?").

The other investigated domains for question generation are analytical reasoning, geometry, history, logic, programming, relational databases, and science. Simple factual wh-questions (i.e. where the answers are short facts that are explicitly mentioned in the input) and gap-fill questions (also known as fill-in-the-blank or close questions) are the most generated types of questions.

An example of question generation in the medical domain follows: A patient reports that she has 'fever and tiredness and sore throat'. A physician suspects that she might have COVID19 but what the patient is saying is insufficient to diagnose it. The physician needs more evidence from the patient. The knowledge base entry for COVID19 is shown below in Table 1:

TABLE 1

| knowledge base entry for COVID 19 | | |
|---|---|---|
| Most common symptoms | Less common symptoms | Serious symptoms |
| fever | aches and pains | difficulty breathing or shortness of breath |
| dry cough | sore throat | |
| tiredness | diarrhea | chest pain or pressure |
| | conjunctivitis | loss of speech or movement |

In Table 1, the features that are underlined are those reported by the patient. To generate questions necessary to confirm the diagnosis, a physician would need to subtract the set of symptoms the patient is reporting from the set of symptoms in the KB. The questions derived this way are:

Do you have dry cough?
Do you have aches and pains?
Do you have diarrhea?

Once the patient answers these questions, the diagnosis can be made. COVID19 is either confirmed or unconfirmed (further investigations are required beyond asking additional questions). In this particular case for COVID19, the symptoms are well structured so a set-theoretic subtraction (complement operation) is used. However, symptom description can be fussier, in different terms, which needs synonym matching, inference. One might say "I don't have enough energy to do things" and an inference that the statement means 'tiredness' may be made to formulate questions.

Symptoms are frequently described in more complex sentences, so more processing steps are required to identify what is missing in patient's description to match a symptom description in the knowledge base entry.

In medical applications, terminology should be selected to accurately handle the logic of the health states of disorder, syndrome and condition. A disorder is a disruption to regular bodily structure and function. Symptoms are sensations that the person with the disease can feel but that cannot be seen by others or measured such as pain or fatigue. A syndrome is a collection of signs and symptoms associated with a specific health-related cause. Disease is often used in a general sense when referring to conditions affecting a physical system (e.g. cardiovascular disease) or a part of the body (e.g. foot diseases).

A medical condition is an umbrella term for an abnormal state of health that interferes with normal or regular feelings of well-being. Condition is the least specific notion, often denoting states of health considered normal or healthy but nevertheless posing implications for the provision of health care such as pregnancy. The term might also be used to indicate grades of health (e.g., a patient might be described as in a stable, serious or critical condition).

The entailment rule that is based on the law of detachment (modus ponendo ponens), which states that if "P implies Q. P is true. Therefore Q must also be true." Example text follows:
Cervical cancer is the only human organ cancer which if detected at an early stage can be 100% cured. In a patient cervical cancer was detected early in the form of the so-called preinvasive cancer (0 degree).
Therefore: This cancer will be cured completely.

An example of inference based on hypothetical syllogism rule. A hypothetical syllogism is a valid argument form, a syllogism with a conditional statement for one or both of its premises.
Rule: If during the bacterial infection the temperature of the patient's body rises, then the number of white blood cells in his/her blood will considerably increase.
Increased leucocyte count causes much faster absorption of bacteria by phagocytosis.
Therefore:
Increased temperature in the course of infection is the immune response of the body and prevention of further development of the disease through phagocytosis.

Figure 3:
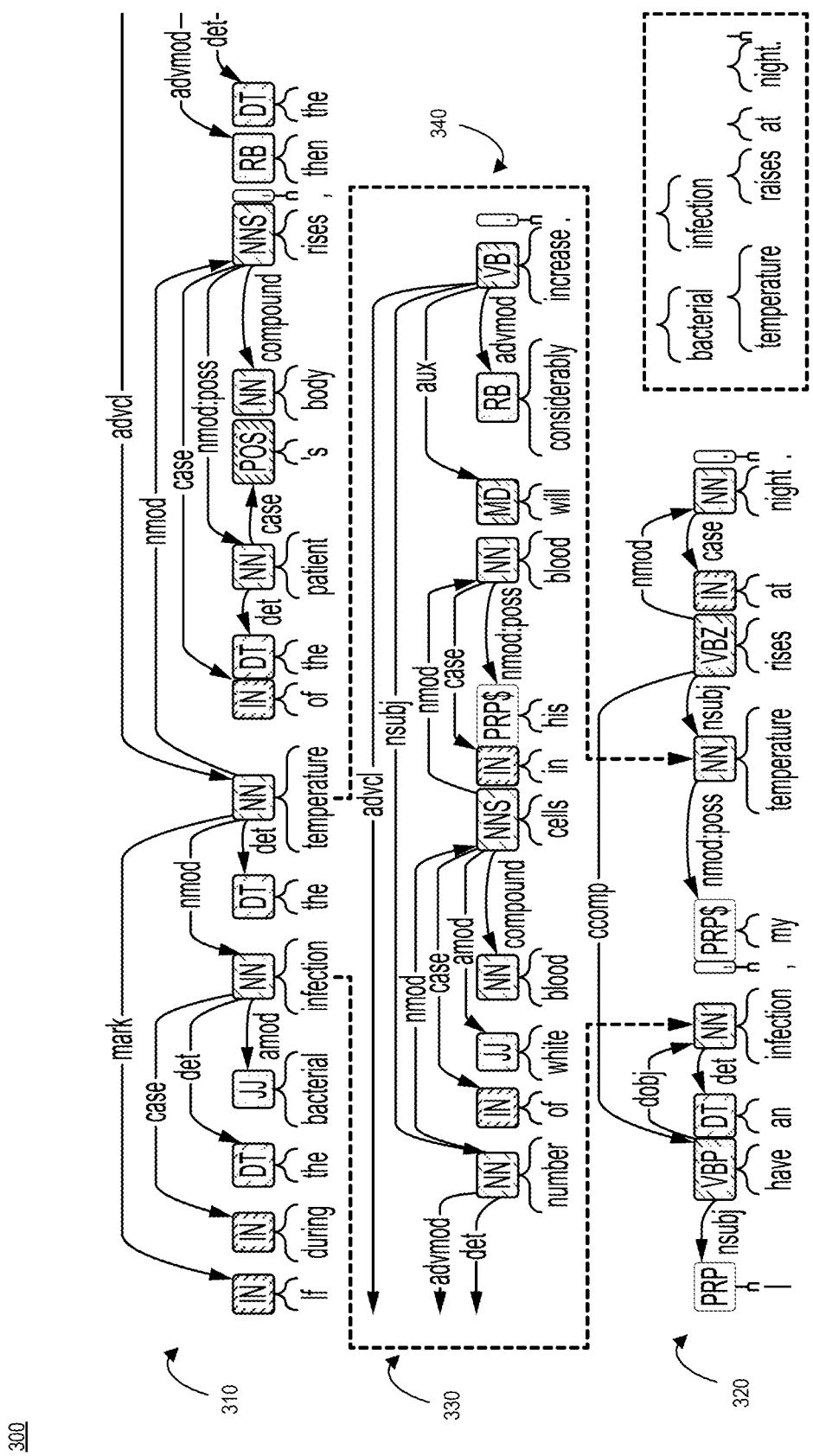
FIG. 3 depicts an exemplary mapping of a syntactic representation, in accordance with an aspect of the present disclosure.

FIG. 3 depicts an exemplary mapping of a syntactic representation, in accordance with an aspect of the present disclosure. More specifically, FIG. 3 depicts mapping 300, which includes syntactic tree 310 and syntactic tree 320.

Syntactic tree 310 represents the text "If during the bacterial infection the temperature of the patient's body rises, then the number of white blood cells in his/her blood will considerably increase." This text represents a first reference text (e.g., the rule representing a body of medical knowledge).

Syntactic tree 320 represents the text "I have an infection, my temperature rose at night." This text represents a second reference text (e.g., information provided by a patient).

Application 122 identifies relationship 330 and relationship 340. Relationship 330 relates the word "infection" in syntactic tree 310 with the word "infection" in syntactic tree 320. Similarly, relationship 340 relates the word "temperature" in syntactic tree 310 with the word "temperature" in syntactic tree 320.

The following questions can be derived from mapping 300:
Case-Rule 1: Is your infection bacterial?
Case-Rule 2: Does your temperature rise at night only?
As can be seen, the above questions, when answered, clarify the relationships 330 and 340, thereby completing the knowledge that is missing from a diagnosis. Even though the same words "infection" and "temperature" exist in both syntactic trees 310 and 320, details should be clarified.

Instead of or in addition to syntactic parsing, semantic parsing can be applied to map the natural language sentence to a semantic representation. A semantic tree refers to a generic representation of semantic information, which includes the meaning of words in a sentence.

AMR is one such semantic representation and can involve generating a rooted, directed, acyclic graph with labels on the edges (relations) and leaves (concepts). AMR includes a readable bank of English sentences paired with their whole-sentence, logical meanings, resulting in semantic parsers that are as ubiquitous as syntactic ones. The building blocks for the AMR representation are concepts and relations between them. Understanding these concepts and their relations is helpful in computing the meaning of a sentence.

Once both of these questions are answered positively, inferences based on the modus tollendo tollens rule can be made. The form of a modus tollens argument resembles a syllogism, with two premises and a conclusion:
If P, then Q.
Not Q.
Therefore, not P.
Continuing the example, applying the modus tollendo tollens rule results in the following:
If the patient has been infected with varicella virus causing chickenpox, then in the period up to three weeks on his/her body will appear blisters surrounded by red border.
The doctor suspects that the patient who has not so far suffered from chickenpox may have had contact with a person infected by varicella virus. He wants to determine whether the patient was infected. After three weeks rash was not visible on the patient's body.
Therefore: The patient was not infected with the chickenpox virus.

Figure 4:
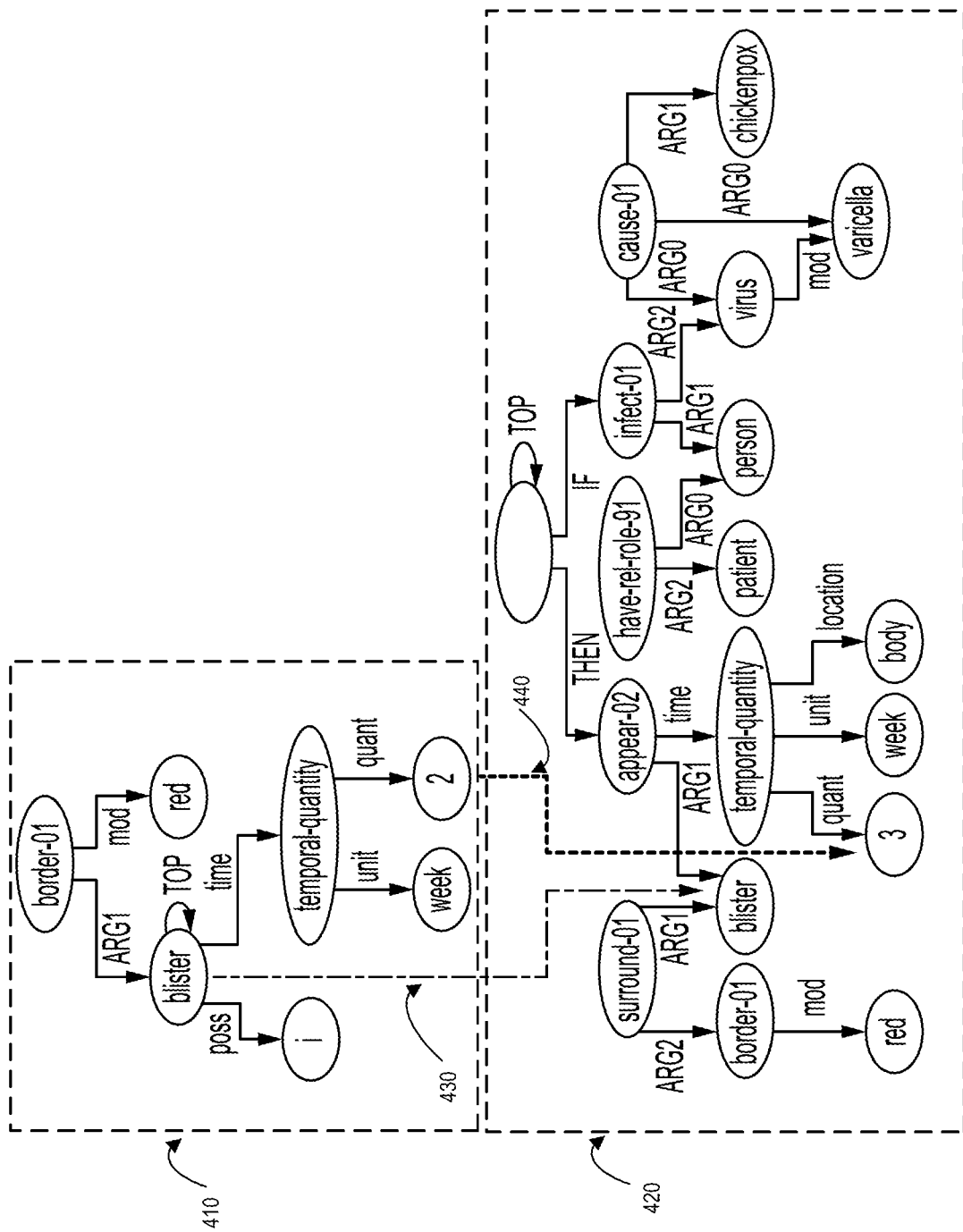
FIG. 4 depicts an exemplary mapping of a semantic representation, in accordance with an aspect of the present disclosure.

FIG. 4 depicts an exemplary mapping of a semantic representation, in accordance with an aspect of the present disclosure. FIG. 4 depicts semantic representation 400, which includes semantic tree 410, semantic tree 420, mapping 430, and mapping 440.

Semantic tree 410 represents a case, with text "Two weeks ago I had blisters with red border." Semantic tree 420 represents the text "If the patient has been infected with varicella virus causing chickenpox, then in the period up to three weeks on his/her body will appear blisters surrounded by red border."

Mapping 430 represents a mapping of the case to a premise. More specifically, mapping 430 maps the entity "blister" in semantic tree 410 to the entity "blister" in the semantic tree 420. Mapping 440 represents a mapping of the case showing disagreement. More specifically, mapping 440 maps the entity "2" which is a quantity ("quant") in semantic tree 420 to the entity "3" which is a quantity ("quant") in the semantic tree 420.

Mapping 440 represents a disagreement because of the difference in entity ("2" versus "3"). Accordingly, application 122 creates the question 'Why two and not three [weeks ago] I had blisters with red border?". Therefore, to formulate a question, the premise—case relationship is determined to attempt to reach the state where the case covers the premise.

Reasoning can be performed in two ways: in accordance with the rules of inference, or by showing a counterexample. The examples below further illustrate reasoning used in the healthcare domain.

TABLE 2

| Reasoning pattern | Statement |
| --- | --- |
| What we are proving | If a man with hemophilia A and healthy woman (who does not have hereditary genetic disorder determined by recessive allele) have a daughter then she is a carrier. |
| Human genetics rule | Healthy woman is always the child of a healthy man. |
| Assumption 1 | The patient is daughter of healthy woman and a man suffering from hemophilia A. |
| We also do a negation of the thesis (Assumption 2) | She is not a carrier. |
| From (Assumption 2) under the Human genetics rule we infer that: It makes contradiction with (Assumption 1). | The patient is daughter of a healthy man. |
| Conclusion | Daughter of a man with hemophilia A and a healthy woman is a carrier. |

Questions as Relative Complement of Linguistic Representations

The representations for desired questions Qs as relative complements of C and K can be defined as sets and as linguistic representation graphs. Examples of discourse-level and semantic-level representations for C and K are provided and show how to derive Qs representations from them.

A description of a disease follows: "People with elevated blood pressure are at increased risk of diabetes. The strength of the association declined with increasing body mass index and age. High blood pressure is associated with stress. Natural therapies such as deep abdominal breathing, progressive muscle relaxation, guided imagery, and biofeedback can help relieve stress. And emotional stress affects people's blood sugar levels. So learning to relax is important in managing your diabetes. However, natural therapies cannot cure diabetes."

A description of a case follows "Case: I have a high blood pressure, eat salty food, have a low body mass index and an average age of 46 My life is associated with stress. I am worried about a risk of diabetes." From the case description, a rule to diagnose a condition can be derived. The phrase that is not covered by Rule Condition is shown in underlined.

The uncovered phrases yield questions whose answers are expected to cover them and then use this knowledge in addition to this available rule to handle the case precisely. There is a need for the question "Does eating salty food <affect disease>?" so that Description of a Disease is hypothetically extended to include "eating salty food worsens the diabetes".

A discourse tree for the Description of a Condition is shown in below, in text form. Indents represent levels of nesting of the discourse tree. The available parts are shown in underlined and the missing parts in [ ] of the rule condition.
contrast
　elaboration (LeftToRight)
　　TEXT: People with elevated blood pressure are at increased risk of diabetes.
　　elaboration (LeftToRight)
　　　elaboration (LeftToRight)
　　　　TEXT: The strength of the association declined with increasing body mass index and age
　　　　TEXT: High blood pressure is associated with stress.
　　elaboration (LeftToRight)
　　　elaboration (LeftToRight)
　　　　joint
　　　　　TEXT: [Natural therapies such as deep abdominal breathing, progressive muscle relaxation, guided imagery,]
　　　　　TEXT: and [biofeedback] can help relieve stress.
　　　　TEXT: And emotional stress affects people's [blood sugar levels].
　　　TEXT: So learning to relax is important in managing your diabetes.
　TEXT: However, [natural therapies] cannot cure diabetes.

The questions to be asked should generalize "Natural therapies such as . . . ", and also put in the logic appropriate with respect of the rhetorical relation it occurs within. Because "natural therapies cannot cure diabetes" occurs as a satellite of Contrast, it has to be asked maintaining a negation: "[Are you aware/make sure the patient knows] that natural therapies cannot cure diabetes?"

Figure 5A:
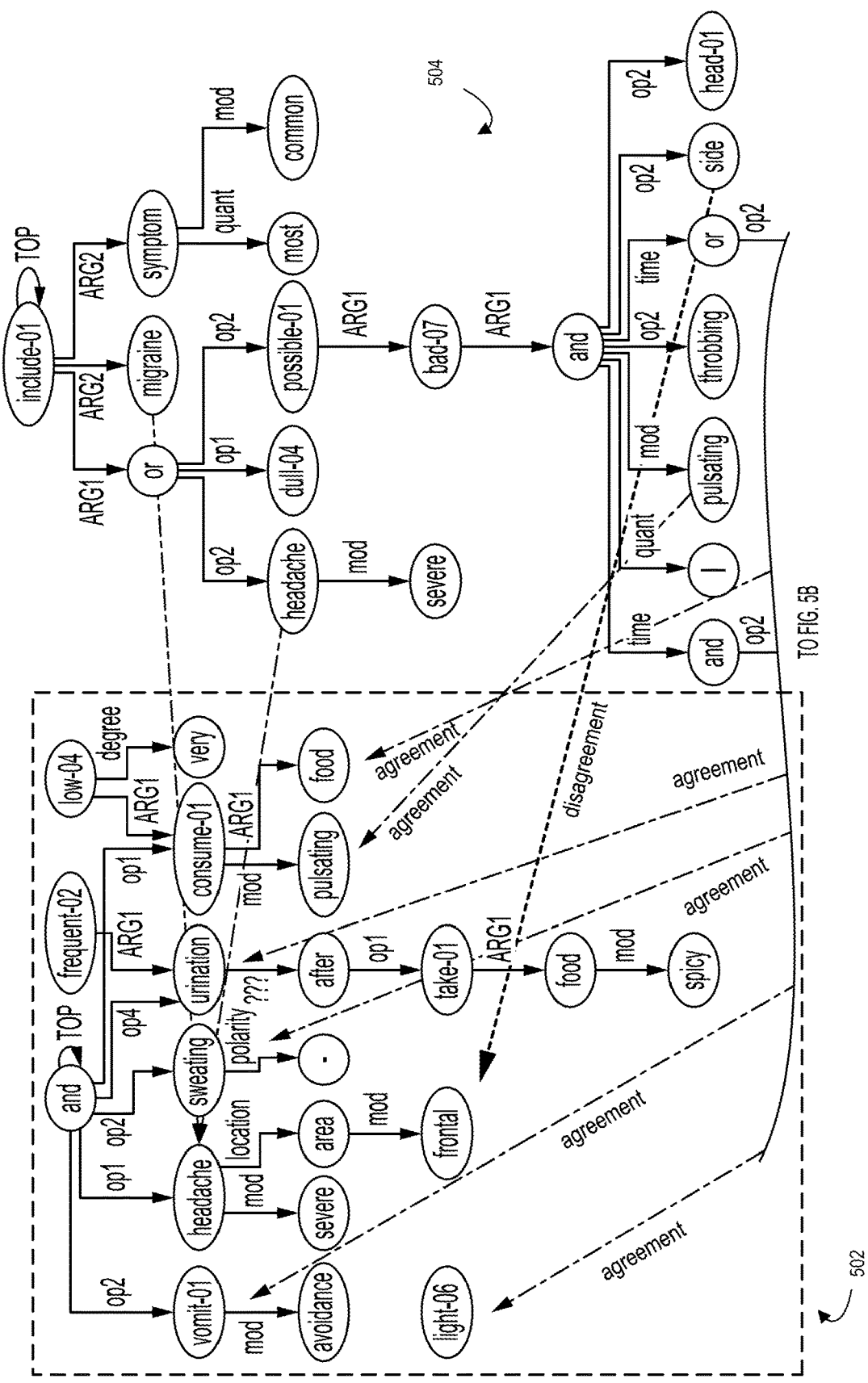
FIG. 5, which includes 5A and 5B, depicts an example of a semantic mapping between texts, in accordance with an embodiment.
Figure 5B:
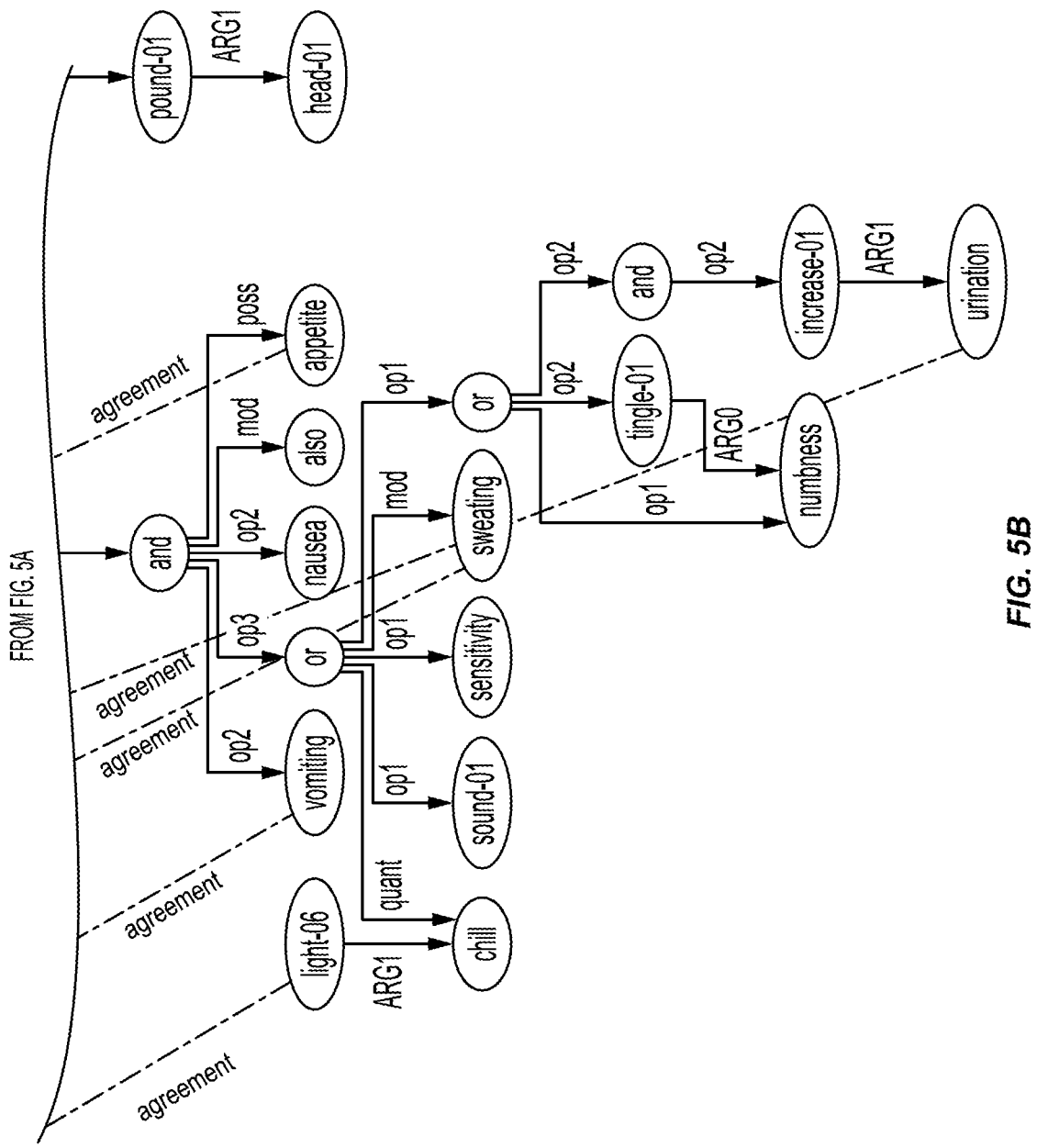

FIG. 5, which includes 5A and 5B, depicts an example of a semantic mapping between texts, in accordance with an embodiment. FIG. 5 includes semantic tree 502, which represents a case, and semantic tree 504, which represents symptoms.

Application 122 can derive questions from semantic trees 502 and 504. To separate the desired but missing questions, this semantic "subtraction" can be performed on a sentence by sentence basis. In the example below, a disease overview, symptoms, and a case are shown below:
Disease Overview
Migraines are a common type of headache that can cause severe pain. They can last for a few hours or a few days and may cause throbbing, sensitivity to sound or light, nausea, or vomiting. Migraines are caused by abnormal brain activity that is triggered by certain foods, stress, or other factors. Some people have an aura before a migraine, which can have symptoms that include temporary vision loss, seeing stars or flashes, or a tingling in an arm or leg. There is no cure for migraines, but medications can help reduce pain or stop migraines from occurring.
Symptoms (Represented by Semantic Tree 504):
The most common symptoms of migraine include a dull or severe headache that may be worse on [one side] of the head, and a throbbing, pulsating, or pounding in the head. Other symptoms may include loss of appetite, nausea and vomiting, sensitivity to sound or light, chills, sweating, numbness or tingling, and increased urination.
Case (Represented by Semantic Tree 502):
A severe headache in [frontal area] that is pulsating, very low food consumption, vomiting, avoidance of light, with no sweating and with a frequent urination after taking spicy food.

Mapping 500 includes mapping between symptoms (labeled as "agreement"). But mapping 500 involves disagreements between symptom and case. For instance, in the mapping 500, a disagreement between a symptom and a case is also shown, specifically that semantic tree 502 includes the "frontal area" and semantic tree 504 includes "one side."

There is a need for a clarification question around these two entities, in the context of the Symptom description. For instance, phrase 'severe headache that may be worse on one side of the head' and form an OR phrase clarifying this disagreement: 'severe headache that may be worse on one side OR frontal area'. Finally, the question 'Is [your] severe headache worse on one side OR frontal area?' is yielded.

Questions are derived from keywords sets of K and C which are called relative complements. If C and K are sets of keywords, then the relative complement of C in K, denoted C\K, is the set of elements in K but not in C. C, $K_1$ and $K_2$ can be viewed as three sets of keywords for a split knowledge base $K_1$ and $K_2$. The following set of complement expressions are provided:

$$C\backslash(K_1 \cap K_2) = (C\backslash K_1) \cup (C\backslash K_2)$$

$$C\backslash(K_1 \cup K_2) = (C\backslash K_1) \cap (C\backslash K_2)$$

A preferential treatment for $K_2$ over $K_1$ is needed:

$$C\backslash(K_2\backslash K_1) = (C \cap K_1) \cup (C\backslash K_2)$$

$$K_2\backslash K_1 \cap C = K_1 \cap (C\backslash K_1)$$

$$K_2\backslash K_1 \cup C = (K_2 \cup C)\backslash(K_1\backslash C)$$

The definition of a complement of two AMR graphs $C_{AMR}$ and $K_{AMR}$ follows. In a simple graph G the edge complement of G, denoted $G_c$, is defined as the graph with the same set of nodes, such that two edges are adjacent in $G_c$ if and only if they are not adjacent in original G. To generate the complement of a graph, all the missing edges required to form a complete graph are filled in, and removes all the edges that were previously there. If H is a subgraph of G, the relative complement G\H is the graph obtained by deleting all the edges of H from G.

$M_{AMR}$ denotes the maximal common sub-graph for $C_{AMR}$ and $K_{AMR}$. To compute representation for questions Qs, a relative complement $M_{AMR}\backslash K_{AMR}$ is defined. A relative complement of $M_{AMR}$ and $K_{AMR}$ denoted by $M_{AMR}\backslash K_{AMR}$, is a graph having the same set of nodes as $K_{AMR}$, with two nodes being adjacent in $M_{AMR}\backslash K_{AMR}$ if the corresponding nodes are adjacent in $K_{AMR}$ but not in $M_{AMR}$. $M_{AMR}$ is a spanning subgraph of $K_{AMR}$ (a subgraph that contains all the vertices of the original graph $K_{AMR}$).

Text can be generated from an AMR graph fragment. Abstract meaning representation (AMR) is a semantic representation. Graph structure reconstruction can be used for an AMR-to-text generation problem. Link prediction objective and distance prediction objective are proposed for enhancing the capturing of structure information and semantic relation in the node representations. The authors perform experiments on two English AMR benchmarks and achieved the new state-of-the-art performance.

Link prediction requires the model to predict the relation between two given nodes or predict the target node (or source node) given a source node (or target node) and a labeled edge. Distance prediction requires the model to predict the distance between two given nodes. All the information to be predicted is explicitly or implicitly provided in the input graph and the model reconstructs the graph structure based on the learned node representations. The former encourages the model to encode the neighbor relation information as much as possible in the node representations, and the latter helps the model to distinguish information from neighboring nodes and distant nodes. The learned node representations with the aid of the two objectives can reduce the errors of mistranslation of semantic relations and missing information in the output texts.

A capability of generating simple fragments of texts from AMR representation is important once AMR representations for C and for K are obtained and then the AMR fragment is derived to form the questions Qs for desired answers. The AMR→text component is important to automatically "invent" questions from high-level abstract representations.

Having described the representation for Qs via sets and graph, the representation can also be expressed as logical representation. Knowledge that is contained in K but is not covered by C can be computed as a complement in C of a generalization between C and K. More precisely, this generalization needs to be least general to include as many uncovered chunks of knowledge in C as possible.

$$Qs = C - \text{anti-unification}(C,K)$$

Anti-unification is the process of constructing a generalization common to two given symbolic expressions. Generalization computation is a common task in learning, where an ML system extracts common features from the given concrete examples.

A term r is generalization of a term t, if t can be obtained from r by a variable substitution. In logic, the problem often is formulated for two terms: given s and t, the problem is to compute their generalization, a term r such that s and t can be obtained from r by some variable substitutions. The interesting generalizations are those which retain maximal similarities between s and t, and abstract over their differences by fresh variables in a uniform way. Such generalizations are called the least general generalizations (LGG). For instance, the terms $f(a, g(a))$ and $f(b, g(b))$, where a and b are constants, have several generalizations: x, $f(x, y)$, $f(x, g(y))$, and $f(x, g(x))$, but the LGG is one: $f(x, g(x))$. It indicates that the original terms have in common the main binary function symbol f and the unary function symbol g in the second argument, and that the first argument of $f$ and the argument of g are the same.

The problem of finding common generalizations of two or more terms has been formulated as computing an LGG which maximally keep the similarities between the input terms and uniformly abstract over differences in them by new variables. For instance, if the input terms are $t=f(a, a)$ and $s=f(b, b)$, then the LGG is LGG $f(x, x)$. It gives more precise information about the structure of t and s than their other generalizations such as, e.g., $f(x, y)$ or just x. Namely, it shows that t and s not only have the same head $f$, but also each of them has its both arguments equal.

Assuming that φ is a given bijection from a pair of terms to variables, LGG can defined recursively via the function that maps pairs of terms to terms:

$$LGG(f(t_1, \ldots, t_n), f(s_1, \ldots, s_n)) = f(LGG(t_1, s_1), \ldots, LGG(t_n, s_n)), \text{ for any } f.$$

$$LGG(t,s) = \varphi(t,s).$$

A single predicate headache( ) is used to formalize both K and C. This predicate headache( ) has the following semantic types of its arguments:

[strength, location, feeling, associated_symptoms, sensitivity].

symptom=headache(strength(severe),location(one_side),feeling([throbbing,pulsating,pounding], [chills( ),sweating( ),numbness( ),tingling( )]), associated_symptoms([appetite(low), nausea( ),vomiting( ),urination(high)]),]),sensitivity([sound( ),light( )])).

case=headache(strength(severe),location(frontal),feeling([pulsating],associated_symptoms([appetite(low),urination(high)]),sensitivity([light(avoidance)])).

LGG(symptom,case)=headache(strength(severe),location(?),feeling([pulsating],associated_symptoms([appetite(low),urination(high)]),sensitivity([light(avoidance)])).

One can observe that some absent symptoms disappear from the LGG. They do not prevent this symptom rule from firing. However, location(?) component shows the deviation of the case from symptom, so the location(?) needs to be clarified, forming a basis for the question.

To obtain the minimal set of necessary questions, LGG (symptom, case) is subtracted from case and obtain headache(_, location(?) , , , ) only. The symbol '_' is used to denote an anonymous variable (any value, unknown value, a result of generalization of two distinct values). The symbol '?' indicates a special case of an anonymous variable.

To derive the maximal set of questions, the LGG(symptom, case) is subtracted from symptom:

symptom−LGG(symptom,case)=headache(location (one_side),feeling([throbbing,pounding],[chills ( ),sweating( ),numbness( ),tingling( )]),associated_symptoms([nausea( ),vomiting( )]),]).

The operation of a relative complement can be defined. Provide are a term t and its m instances $t_1, \ldots, t_m$ of t. $t/t_1 \lor \ldots \lor t_m$ denotes the set G of all ground terms that are instances of t but are not instances of any of the terms $t_1, \ldots, t_m$. The relative complement $t_1' \lor \ldots \lor t_k'$ of t with respect to $t_1, \ldots, t_m$ is a minimal explicit representation of G. G is the union of ground instances of the terms $t_1' \lor \ldots \lor t_k'$ and that $t_i'$ and $t_j'$, for i≠j, have no instances in common. Computing the relative complement is useful in ML where a concept can be expressed via a collection of terms along with the exceptions for their values.

Generalization relation can be defined on a set of terms. A one-to-one generalization introduced above, directly induced from relation≤( . . . less general than . . . ) is insufficient to grasp what is required from a correct generalization relation.

Men and women can be represented with 3 attributes: beauty, intelligence and size. What is the negation of term man(beautiful, intelligent)? Intuitively, one single term cannot describe it: a negation could be "being a woman", "being an ugly man" or "being a dumb man". "Being a dog" can be discarded by the Closed World Assumption: this description cannot be obtained by the signature. So to describe the negation, it is necessary to represent all possibilities of incompatible terms. This can be done through taking the most general of these terms, hence a correct negation could be described through the set of three terms: {woman(_, _), man(ugly, _), man(dumb, _)}. But since that forces us to manipulate sets of terms, how does the generalization relation transpose to such sets? Is one-to-one generalization sufficient? Take for instance (for the same signature as above) the set of terms:

G={man(ugly,tall),man(dumb,small)}

This set generalizes the completely instantiated terms:

man(ugly,dumb,tall) and man(ugly,dumb,small)

by one-to-one use of relation≤for the generalization degree. But then, using again the Closed World Assumption (a man in our signature can only be tall or small) these are all the possible instances of the term: man(ugly, dumb, _).

One least general generalization (LGG) algorithm exists for clauses, which are disjunctions (or sets) of atomic formulas or their negations. The notion of generalization there differs from the same notion for terms: A clause L is more general than a clause D (written L≤D) iff there exists a substitution ϑ such that Lϑ⊆D (in words, L ϑ-subsumes D). For instance, {¬q(x, y), ¬q(y, x), p(x)}≤{¬q(x, x), p(x)}, which can be seen easily, taking ϑ={y−>x}. LGG for clauses is unique modulo≤and the equivalence generated by the subsumption relation.

Concerning anti-unification for higher-order terms, LGGs are not unique and special fragments or variants of the problem have to be considered to guarantee uniqueness of lggs. Such special cases include generalizations with higher-order patterns, object terms, restricted terms, etc. For instance, a pattern LGG of λx.f(g(x)) and λx.h(g(x)) is λx.Y(x), ignoring the fact that those terms have a common subterm g(x). It happens because the pattern restriction requires free variables to apply to sequences of distinct bound variables. A generalization in which the free variable Y is obtained, which applies to the bound variable x, and not to the more complex common subterm g(x) of the given terms.

To define the meaning of a sentence, phrase or word, n-grams can be used. The meaning of an n-gram is "whatever is common among all contexts where the n-gram can be used". This "common" knowledge is formalized with the help of LGGs with respect to ϑ-subsumption. For instance, for two contexts {obj(o1), clr(o1,re), shp(o1,bone), obj(o2), clr(o2,gr), shp(o2, cartilage), relpos(o1,lo,o2)} and {obj (o3), clr(o3,gr), shp(o3, cartilage), obj(o4), clr(o4,re), shp (o4, cartilage), relpos(o3,lo,o4)}, their LGG, the most specific common pattern of both contexts, is {obj(B), clr(B,re), shp(B,D), obj(E), clr(E,gr), shp(E, cartilage), obj(A), clr(A, C), shp(A,D), relpos(A,lo,F), obj(F), clr(F,G), shp(F, cartilage)}, where the capital letters are variables. It states that there are red and green objects (the objects B and E, respectively), E is a cartilage, and there is an object A to the left of cartilage F. It does not imply that these objects are necessarily distinct. The meaning of an n-gram is the most specific common pattern of all the contexts where it can be used. There is a simple algorithm that incrementally learns the meaning of specific n-grams: whenever a new example (context/phrase pair) (C, P) appears, update the meaning of each n-gram G in P with respect to C, i.e., use the procedure Update(G, C). The latter can be defined as Update(G,C):—if Meaning(G) is undefined then
Meaning(G):=C else Meaning(G):=LGG(C, Meaning(G)).

FIG. 6 depicts an exemplary process 600 for generating questions from text, in accordance with an aspect. For instance, given a case description C, disclosed solutions find relevant knowledge about symptoms of about a disease K using semantic or syntactic relevance assessment. For instance, to estimate C\K, disclosed solutions form semantic (AMR) and syntactic representations for each of C and K, map the representation for C into the representation for K, and align the representations.

At block 601, process 600 involves forming a first semantic tree from a first reference text and second semantic tree from a second reference text. An example of a first reference text is case information (C) 202 and an example of a second reference text is knowledge (K) 206. Application 122 forms a first semantic tree from case information (C) 202 and a second semantic tree from knowledge (K) 206.

Each semantic tree includes nodes and edges and each node represents a role of a corresponding entity. Each edge represents a relationship between two of the entities. In an example, the nodes represent entities (e.g., a place, person, or thing). Each edge represents a relationship between two of the entities. Information from a semantic tree can alternatively be represented by text. In some cases, a question is converted into normalized or sentence form prior to the creation of the semantic tree.

At block 602, process 600 involves identifying, from the first semantic tree and the second semantic tree, a set of semantic nodes that are in the first semantic tree and not in the second semantic tree. One approach is to first find nodes in common. For example, application 122 can first determine a commonality such as by forming a maximal common subtree. Then, from the commonality, application 112 can subtract the common semantic nodes from the nodes in the second semantic tree.

Identifying nodes that are common to two trees can be accomplished by generalization or identifying a maximal common subtree. A maximal common subtree includes a maximum number of nodes that each represent a common entity that is common between the first semantic tree and the second semantic tree and includes edges between the nodes that represent a semantic relationship between the two or more of the common entities. Once a maximal common subtree is created, then the nodes that are in the semantic maximal common subtree are removed from the first semantic tree.

Different approaches can be used to identify a common subtree, including aligning the first and second semantic trees. For instance, a common subtree includes nodes, each of which represents an entity that is common between the first semantic tree and the second semantic tree and has edges between the nodes that represent a semantic relationship between the entities. The nodes are shared in the first semantic tree and the second semantic tree.

Identifying a common subtree can involve aligning the trees. The graph alignment algorithm chooses as the initial seed a pair of nodes v and u from AMR and T which have the smallest cost. Ties are broken randomly. Once the seed is found, the spheres of all possible radii around nodes v and u are built. A sphere of radius r around node v is the set of nodes $S_{AMR}(v, r)$ $\{x \in AMR: d(v, x)=r\}$ that are at distance r from v, where the distance d(v, x) is the length of the shortest path from v to x. Spheres of the same radius in two networks are then greedily aligned together by searching for the pairs (v', u'): $v' \in S_{AMR}(v, r)$ and $u' \in S_T(u, r)$ that are not already aligned and that can be aligned with the minimal cost.

When all spheres around the initial seed (v, u) have been aligned, other nodes in both AMR and T are still unaligned. The same algorithm is repeated on a pair of graphs $(AMR^p, T^p)$ for p=1 . . . 3 and attempt to identify a new seed again, if necessary. The graph $AMR^p$ is defined as a new graph $AMR^p=(V, E^p)$ having the same set of nodes as AMR and having $(v,x) \in E^p$ if and only if the distance between nodes v and x in AMR is less than or equal top. In other words $d_{AMR}(v, x) \leq p$. $AMR^1=AMR$. Using $AMR^p$ (p>1) aligns a path of length p in one graph to a single edge in another graph, which is analogous to allowing "insertions" or "deletions" in a sequence alignment. The alignment procedure is stopped when each node from AMR is aligned to exactly one node in T.

At block 603, process 600 involves forming a first syntactic tree for the first reference text and a second syntactic tree for the second reference text. Each syntactic tree includes terminal nodes that represent words and syntactic nodes that represent syntactic categories. Each syntactic tree includes syntactic nodes that represent a word and an associated part of speech. An example of a syntactic tree is shown in FIG. 3.

At block 604, process 600 involves identifying, from the first syntactic tree and the second syntactic tree, a set of syntactic nodes that are in the first syntactic tree but not in the second syntactic tree. Different approaches can be used. For example, common nodes can first be determined. Application 122 can first determine a commonality such as by forming a maximal common subtree, by using machine learning, or by using generalization. Then, from the commonality, application 122 can identify and remove the common nodes from the nodes in the second syntactic tree.

For instance, using the maximal common subtree approach, application 122 identifies, from the first syntactic tree and the second syntactic tree, a syntactic maximal common subtree. The syntactic maximal common subtree includes a maximum number of nodes where each node represents a common entity that is common between the first syntactic tree and the second syntactic tree and where parent nodes that represent a syntactic category of one or more of the nodes. Application 122 removes, from the first syntactic tree, nodes that are in the syntactic maximal common subtree.

In an aspect, a machine-learning based approach can identify common nodes. In this case, the syntactic trees are provided to a trained machine-learning model (e.g., machine learning model 130, which identifies and outputs the common syntactic nodes. The common syntactic nodes are connected between the first and second syntactic trees.

In another example, an algorithmic approach can be used such as syntactic generalization. In an example, the first syntactic tree and second syntactic tree can be merged into a common tree. Within the common tree, a noun or an entity common to both syntactic trees is identified.

To measure similarity of abstract entities expressed by logic formulas, a least-general generalization is proposed for a number of machine learning approaches, including explanation based learning and inductive logic programming. For two words of the same part of speech (POS), their generalization is the same word with the POS. If the lemmas for the two words are different, but the POS is the same, then the POS remains in the result. If lemmas are the same, but POS is different, lemma stays in the result. A lemma represents a word without the related part-of-speech information.

To illustrate this concept, consider an example of two natural language expressions. The meanings of the expressions are represented by logic formulas. The unification and anti-unification of these formulas are constructed. Some words (entities) are mapped to predicates, some are mapped into their arguments, and some other words do not explicitly occur in logic form representation, but indicate the above instantiation of predicates with arguments.

Consider the following two sentences "camera with digital zoom" and "camera with zoom for beginners." To express the meanings, the following logic predicates are used:
camera(name_of_feature, type_of_users) and
zoom(type_of_zoom).

Note that this is a simplified example, and as such, may have a reduced number of arguments as compared to more typical examples. Continuing the example, the above expressions can be represented as:
camera(zoom(digital), AnyUser), and
camera(zoom(AnyZoom), beginner)

According to the notation, variables (non-instantiated values, not specified in NL expressions) are capitalized. Given the above pair of formulas, unification computes their most general specialization camera(zoom(digital), beginner), and anti-unification computes their most specific generalization, camera(zoom(AnyZoom), AnyUser).

At the syntactic level, the expressions are subjected to a generalization ('^') of two noun phrases as: {NN-camera, PRP-with, [digital], NN-zoom [for beginners]}. The expressions in square brackets are eliminated because they occur in one expression, but do not occur in the other. As a result, obtain{NN-camera, PRP-with, NN-zoom]}, which is a syntactic analog of semantic generalization, is obtained.

The purpose of an abstract generalization is to find commonality between portions of text at various semantic levels. Generalization operation occurs on the one or more levels. Examples of levels are paragraph level, sentence level, phrase level, and word level.

At each level (except word-level), individual words, the result of generalization of two expressions is a set of expressions. In such set, for each pair of expressions, so that one is less general than other, the latter is eliminated. Generalization of two sets of expressions is a set of sets which are the results of pair-wise generalization of these expressions.

Only a single generalization exists for a pair of words: if words are the same in the same form, the result is a node with this word in this form. To involve word2vec models (Mikolov et al., 2015), compute generalization of two different words, the following rule is used. If subject1=subject2, then subject1^subject2=<subject1, POS (subject1), 1>. Otherwise, if they have the same part-of-speech, subject1^subject2=<*,POS(subject1), word2vecDistance(subject1^subject2)>. If part-of-speech is different, generalization is an empty tuple. It cannot be further generalized.

For a pair of phrases, generalization includes all maximum ordered sets of generalization nodes for words in phrases so that the order of words is retained. In the following example, "To buy digital camera today, on Monday."
"Digital camera was a good buy today, first Monday of the month."

Generalization is {<JJ-digital, NN-camera>,<NN-today, ADV, Monday>}, where the generalization for noun phrases is followed by the generalization for an adverbial phrase. Verb buy is excluded from both generalizations because it occurs in a different order in the above phrases. Buy—digital—camera is not a generalization phrase because buy occurs in different sequence with the other generalization nodes.

In another example,
"movie from spain"
and "movie from italy"
then generalization is "movie from [COUNTRY]"
everything that is common remains; everything that is different is removed.

Returning to process 600, at block 605, process 600 involves mapping the set of semantic nodes to the set of syntactic nodes by identifying a correspondence between a first node in the set of semantic nodes and a second node in the set of syntactic nodes, where the first node and the second node are associated with an identical normalized word.

For example, application 122 identifies a first node in the set of semantic nodes and a second node in the set of syntactic nodes that correspond to the same normalized word. An example of a normalized word is a lemma. For instance, a lemma of "am" is "be." In some cases, the word in common could be exactly the same word, e.g., "house." In other cases, the word could relate to the same entity but be a different word. Examples of entities include nouns such as people, places, and things.

Block 606 can continue, potentially identifying many identical words between the set of semantic nodes and the set of syntactic nodes.

At block 606, process 600 involves forming a question fragment from one or more of the normalized word, the set of semantic nodes, and the set of syntactic nodes. Various approaches can be used to form a question fragment.

For example, forming a question can include identifying that the normalized word represents either (i) a noun, (ii) a verb, (iii) an adjective, or (iv) an adverb. This identification include constructing a parse tree (syntactic tree) from text associated with the subset of common nodes. The parse tree includes nodes, e.g., for a noun phrase or a verb phrase. Application 122 selects, from the nodes, a node that represents either a noun, a verb, adjective, and/or adverb.

Continuing the example, application 122 can then replace the identified word with a question word. Examples of question words are what, where, whom, who, how, or whose. Other question words are possible. Table 3, below, lists some examples of how various parts of a parse tree can be replaced with question words.

TABLE 3 question word insertion
Using Syntax Guide Question Formation

| Node(s) Deleted | Formed Question |
| --- | --- |
| Noun Phrase (NP) - | Noun and preposition of noun are replaced<br>Example:<br>"The president of US announced a . . . "<br>Substitution: "The president of US" -> Who<br>Q = Who announced . . . ? |
| Verb Phrase (VP) | Verb and verb subject are replaced with what/when/where<br>Example:<br>The president of US announced a new series of project to improve the security of state<br>VP = announced a new series of projects . . . =><br>Verb + Verb subject => announced what/when/where<br>Substitution: Verb itself -> what<br>Question: what did the president announce |
| Predicate + Subject | President announced => subject + predicate + VP (predicate)<br>Wh part = VP-verb itself = for whom/to what audience/for what purpose<br>Substitution: President announce for X,<br>X -> What . . . ?<br>Question: President announced for whom?<br>President announced to which of his supporters<br>President announced for what reason |
| Verb phrase + noun phrase | Formed question = noun phrase with Wh word<br>Verb phrase = Announced on the summer evening<br>Noun phrase = the summer evening<br>Substitution: noun phrase => when/what/where<br>Question: when did announce?<br>What did announce, where did announce |
| Verb phrase, considering VerbNet roles | Phrase = "Announced about relationship with China"<br>Verb Net (Announced): Who, ToWhom, What, When, Where)<br>Select role: When<br>Question: When announced about relationship with China? |
| Communicative verb phrase with its subject | Phrase: said that the president announced<br>Subject = the president announce<br>Substitution "president" -> Who<br>Question: who announced? |

TABLE 3-continued question word insertion
Using Syntax Guide Question Formation

| Node(s) Deleted | Formed Question |
|---|---|
| Possessive noun phrase | Phrase = President's announcement<br>Substitution President's -> whose<br>Question: Whose announcement?<br>Phrase = President of China<br>Substitution = President of China =><br>president of what<br>Q: President of what . . . announced? |

In another aspect, templates can be used to form questions. For example, application 122 extracts a candidate question fragment from the text associated with the subset of common nodes. Application 122 then identifies a level of similarity between the candidate question fragment and a text fragment template. The text fragment templates can be stored in a table. Examples of candidate question fragments are shown in Table 3.

Determining the level of similarity can be performed using syntactic generalization. For example, the question fragment and a text fragment template are generalized, creating a generalized result. Application 122 identifies a level of similarity as measured by a number of matching entities and identical relationships between entities in the generalized result.

A similarity threshold can be used. For instance, if the level of similarity is greater than a threshold, then application 122 identifies the candidate question fragment as the question fragment.

At block 607, process 600 involves providing the question fragment to a user device. In response, the user device can provide an answer to the question. Application 122 can then update one or more of case information (C) 202 (e.g. a first reference text) or knowledge (K) 206 (e.g. a second reference text) accordingly.

Question Broadening

In an aspect, reasoning chains are employed to broaden the generated questions. Artificial intelligence (AI) can be used to build reasoning chains. AI has long pursued the goal of giving a system explicit knowledge, and having it reason over that knowledge to reach conclusions. This form of reasoning is capable of supporting question-answering, explainability, correctability, and counterfactual reasoning components and systems.

Reasoning based on rules expressed in language is quite distinct from question-answering as selecting an answer span in a passage. Rather, it is desired that systems reason over the provided rules to find conclusions that follow. The goal is also distinct from that of inducing rules from examples, e.g., given instances of family relationships, inducing that a father's father is a grandfather, something that transformers are already known to do well. Instead, the authors provide rules explicitly, and expect transformers to draw appropriate conclusions. Rather than inducing rules from examples, certain aspects involve using learning to emulate a reasoning algorithm.

Given a set of facts and clauses, a reasoning chain builder applies clauses to facts to derive new facts related to a question. Rules are linguistic expressions of conjunctive implications condition: [∧ condition]*→conclusion, with the semantics of logic programs with negation and Closed World Assumption. Reasoning is the deduction of a statement's truth values according to these semantics.

One expects that knowledge in an expert system should be easy to examine and to change, and also that the system should be able to provide explanations of its results. At first sight, the knowledge in a logic program is easy to change, since it consists simply of facts and rules. From the declarative point of view, this is indeed the case. However, a common difficulty is that the addition of a rule with an intended declarative meaning has unintended procedural effects when the knowledge is interpreted by a particular inference engine. For example, the following rule has an obvious common sense declarative meaning, but it can cause control problems for several well-known inference mechanisms, including that of a logic program:

('disease X is associated with disease Y') if ('disease Y is associated with disease X')

To address this problem, Apt et al (1988) proposes a useful class of logic programs with negation, called stratified programs, that disallow certain combinations of recursion and negation. Programs in this class have a simple declarative and procedural meaning based, respectively, on model theory and a back-chaining interpreter. The standard model of a stratified program, which gives the program a declarative meaning and is independent of the stratification, is characterized in two ways:

1) A fixed point theory of nonmonotonic operators;
2) An abstract declarative characterization.

Traditional formal reasoning applies a theorem prover to axioms in order to answer a question. (b) Our work here strives for a linguistic analog, where a transformer serves as a "soft theorem prover" over knowledge expressed linguistically.

The Closed World Assumption (CWA) is the assumption that what is not known to be true must be false. Reiter (1987) introduced 'closed world' assumptions to describe the interpretation of an empty or failed query result on a database as equivalent to a negation of the facts asserted in the query. 'In a closed world, negation as failure is equivalent to ordinary negation. In other words, the set of facts contained in a database are assumed to be complete descriptions of a given domain. Any proposition not either directly stated or indirectly inferable is interpreted to be false.

The Open World Assumption (OWA) is the opposite. It is the assumption that what is not known to be true is simply unknown. Under OWA, reasoning is monotonic: no new information added to a database can invalidate existing information, and the deductive conclusions which can be drawn from it (Sowa 2000).

Let us consider the following statement: 'Juan has a flu.' Now, what if we were to ask 'Does Juan have a diabetes?' Under a CWA, the answer is 'no'. Under the OWA, it is 'I don't know'.

The automated building of reasoning chains is important to dramatically raise the number of questions for the same desired value (such as blood pressure). This is achieved by involving a variety of entities in phrasing to make sure the users are comfortable with at least some ways the questions are formulated. In addition to asking "What is your blood pressure?", the component extends the list of associated attributes such as "Do you have a nosebleed?", "Do you experience fatigue or confusion?". Hence this component is used to broaden questions, connect them with more entities and more attributes and assuring that answering is easy and natural for the user.

An Exemplary Autonomous Agent

Automated formation of clarification question naturally fits into an autonomous agent (e.g., a chatbot) that makes diagnosis from communication with a patient. Once C is specified as the initial user utterance, the agent finds closest Ks to C and builds critical questions for each Ks. After that, these questions are offered to the patient and her answer are obtained until the symptoms are properly identified.

In an example, an autonomous agent can use the techniques disclosed herein to discuss symptoms and conditions with a medical patient. For example, the agent can answer the patient's questions, determine patient is ready to share symptoms and receive diagnosis, and ask patient to share symptoms as detailed as possible. Based on this information, the agent then forms the questions (e.g., using process 600). The agent presents the questions to the user. In some cases, the agent can ask a minimal (reduced) set of questions. In other cases, the agent can ask a full set of questions. With the responses to the questions, the agent can then complete the case and provide the doctor the information and/or the patient with a diagnosis.

Other wrapper induction techniques consider webpage as a sequence of tokens. Such techniques determine frequent tokens and their frequency of occurrence, stores the tokens with the same frequency of occurrence in a single equivalence class, and then finds the Large and Frequently occurring Equivalence Class (LFEQ) which represents the template of the web page. There is also a Document Object Model (DOM) tree based approach which performs merging of DOM trees to deduce fixed or variant pattern tree and the pattern tree represents the web page schema. The approach finds difficulty to deal with real world websites with several hundreds of web pages.

An analysis was performed of various Medical forum websites based on organization of posts and structuring of posts. Then an automated framework for extracting posts from Health Discussion Forums was built and an assessment of extraction accuracy was performed by randomly selecting forum web pages belonging to various Health Discussion Forum websites, as shown below in Table 4:

TABLE 4

Sample source of data for evaluation of question generator and the overall system for making diagnosis

| Source | WebMD | Kaggle Disease Symptom Prediction dataset | Patient.info |
|---|---|---|---|
| Example text | Hyperthyroidism (overactive thyroid) occurs when your thyroid gland produces too much of the hormone thyroxine. Hyperthyroidism can accelerate your body's metabolism, causing unintentional weight loss and a rapid or irregular heartbeat. | Hyperthyroidism Signs and Symptoms Common signs include: Nervousness, anxiety, or crankiness Mood swings Fatigue or weakness Sensitivity to heat A swollen thyroid (called a goiter). You might see swelling at the base of your neck. Losing weight suddenly, without trying Fast or uneven heartbeat or palpitations (pounding in your heart) Having more bowel movements Shaking in your hands and fingers (tremor) Sleep problems Thinning skin Fine, brittle hair Changes in your menstrual cycle | Hypothyroidism often has an insidious onset but has a significant morbidity. The clinical features are often subtle and nonspecific and may be wrongly attributed to other illnesses, especially in postpartum women and in the elderly. The earliest biochemical abnormality is an increase in serum thyroid-stimulating hormone (TSH) concentration with normal serum fT4 and fT3 concentrations (subclinical hypothyroidism), followed by a decrease in serum fT4, at which stage most patients have symptoms and require treatment (overt hypothyroidism). |
| Role | K | C can be derived from text by random phrase removes | C can be derived from text by random phrase removes |
| Quantity | 136 | 421 | 113 |

Data Collection and Evaluation

Previous work exists in the area of information extraction in the past decades ranging from hand-crafted wrappers to fully automatic techniques. For instance, commercial tools have been introduced to facilitate extraction by non-expert users. These tools come with sophisticated user interface which allows users to select target of extraction. All these tools are semi-supervised and require human intervention.

To minimize level of human intervention, several automatic wrapper induction techniques exist that determine a template given a sample web page and expresses it as Union Free Regular Expression (UFRE). Such techniques use UFRE for extraction of data from similarly structured pages and faced difficulty for pages having missing attributes.

To support the Automated Builder of Reasoning Chains, five datasets were generated by requiring various depths of inference to answer the questions. Each example in a dataset is a triple (context,statement,answer), where context has the form (fact*,rule*), statement is the question, namely a declarative sentence to prove, and answer is either T (true) if statement deductively follows from the context, or F if it does not (false under a closed-world assumption, CWA). Facts, rules, and the question statements are expressed in (synthetic) English. Each example is essentially a (linguistic) standalone logical theory with an "Is it true?" question posed against it.

To generate each example, a small theory (facts+rules) in logic needs to be produced first, and forward inference has to be performed to derive all its implications. Question statements are then selected from those implications (answer=true), and from unproven (positive) facts (answer=false, under the CWA). Five datasets were obtained, each constrained by the maximum depth of inference (nesting level) required to prove the facts used in its questions, with the nesting level n=0, n≤1, n≤2, n≤3 and n≤5 respectively. Nesting level n=0 means the true facts can be "proved" by simple lookup in the context (no inference). The fifth dataset included questions up to nesting level five, and is used to test generalization to nesting levels unreached in training on the other four datasets.

The WebMD dataset was used for K and Kaggle Disease Symptom Prediction dataset plus Patient.info for C. An evaluation of the formed questions are meaningful is shown in Table 5 below:

TABLE 5

Forming of questions to validate meaningfulness and correctness

| Common symptom | Correctness in identification of unmatched parameters, % | Correctness of building the query phrase, % | Correctness of forming the questions, % | Overall Correctness of K - C match, % |
|---|---|---|---|---|
| Bloating | 83.1 | 81.6 | 76.2 | 73.1 |
| Cough | 88.7 | 87.1 | 82.4 | 77.5 |
| Diarrhea | 91.0 | 86.2 | 82.0 | 76.3 |
| Dizziness | 86.3 | 82.7 | 79.9 | 76.0 |
| Fatigue | 92.6 | 87.9 | 83.1 | 80.7 |
| Fever | 90.1 | 85.2 | 82.5 | 78.6 |
| Headache | 84.6 | 81.3 | 77.4 | 74.2 |
| Muscle Cramp | 88.9 | 86.2 | 82.0 | 79.1 |
| Nausea | 86.0 | 80.3 | 77.5 | 72.7 |
| Throat irritation | 93.4 | 89.0 | 86.1 | 83.4 |
| Average | 88.47 | 84.75 | 80.91 | 77.16 |
| Loss of performance at each step | | 4.4 | 4.8 | 4.9 |

An end-to-end evaluation of an automated diagnosis system was performed. For each case C find the symptom description S from K which covers it such that there is no such S' from K which would also cover C is desired. In this evaluation, the main goal is to track if there is an improvement in diagnosis due to successful generation of additional questions so that the rule from K can fire once the answers are available. Questions are generated according disclosed solutions, but an answer is automatically obtained from additionally available patient records. Although it can be the case in some of anticipated deployment settings, the primary target of the developed technique is to obtain answers from human patients rather than from an automated system. The automated answering system is used for the purpose of evaluation scale.

Two settings are experimented for in terms of obtaining answers:
1) Once the question is formulated, we automatically provide a default value for a given disease (such as 100 F). This is a simpler evaluation setting.
2) The value from the additional textual data in a patient record is extracted (this extraction is implemented for the purpose of evaluation only. This is more sophisticated evaluation setting with additional noise due to extraction errors.

The percentage of cases with the correct diagnosis for various assessment settings is shown below in Table 5.

TABLE 5

Correctness of diagnosis once the questions are answered

| Common symptom | Correctness of diagnosis without additional questions, % | Correctness of diagnosis with default additional questions, % | Correctness of diagnosis where answers are auto-extracted (imitated) from additional records, % |
|---|---|---|---|
| Bloating | 74.2 | 77.3 | 75.3 |
| Cough | 78.1 | 81.4 | 79.0 |
| Diarrhea | 75.3 | 82.0 | 80.4 |
| Dizziness | 77.0 | 81.3 | 82.0 |
| Fatigue | 72.8 | 78.8 | 76.5 |
| Fever | 71.4 | 77.9 | 75.0 |
| Headache | 74.8 | 78.4 | 73.2 |
| Muscle Cramp | 72.9 | 76.5 | 75.1 |
| Nausea | 74.0 | 79.6 | 77.3 |
| Throat irritation | 77.2 | 82.4 | 79.6 |
| Average | 74.77 | 79.56 | 77.34 |
| Gain of performance at each step | | 6.4% | 3.4% |

One can observe that obtaining information about the default values boosts the diagnosis accuracy by more than 6%. Improvement of the diagnosis rate by means of acquiring knowledge about required parameters extracted from text is more modest and only exceeds 3%. The real-life rise of accuracy with patents and doctors answering questions would be in between these values. These improvement values are more important characteristics of the proposed approach in comparison with the accuracy rates themselves, which are determined by specific disease and data availability and collection methods.

Building Questions Via Generalization of Instances

In an aspect, questions can also be formed by generalization of instances. Frequently novice users of search engines experience difficulties formulating their queries, especially when these queries are long. It is often hard for user who is new to a domain to pick proper keywords. Even for advanced users exploring data via querying, including web queries, it is usually hard to estimate proper generality/specificity of a query being formulated. Lattice querying makes it easier for a broad range of user and data exploration tasks to formulate the query: given a few examples, it formulates the query automatically.

In this section we introduce the technique of lattice querying which automatically forms questions from the set of text samples provided by a user by generalizing them from the respective parse trees. Also, the system produces search results by matching parse trees of this query with that of candidate answers. Lattice queries allow increase in big data exploration efficiency since they form multiple hypotheses concerning user intent and explore data from multiple angles (generalizations).

Exploring data, mostly keyword query and phrase query are popular, as well as natural language-like ones. Users of search engines also appreciate 'fuzzy match' queries, which help to explore new areas where the knowledge of exact keywords is lacking. Using synonyms, taxonomies, ontologies and query expansions helps to substitute user keywords with the domain-specific ones to find what the system believes users are looking. Lattice queries increase usability of search, proceeding from expressions in user terms towards queries against available data sources.

The idea of lattice query is introduced. Instead of a user formulating a query exploring a dataset, he provides a few samples (expressions of interest) so that the system formulates a query as an overlap (generalization) of these samples, applied in the form of a lattice (shown in bold on the bottom).

Proceeding from a keyword query to regular expressions or fuzzy one allows making search more general, flexible, assists in exploration of a new domain, as set of document with unknown vocabulary. What can be a further step in this direction? We introduce lattice questions, based on NL expressions that are generalized into an actual lattice question.

There is a broad range of search engine query types with string character-based similarity. They include Boolean queries, span queries which restrict the distances between keywords in a document, regular expressions queries which allow a range of characters at certain positions, fuzzy match queries and more-like-this queries which allow substitution of certain characters based on string distances. Other kinds of queries allow expressing constraints in a particular dimension, such as geo-shape query. Proceeding from a keyword query to regular expression or fuzzy one allows making search more general, flexible, assists in exploration of a new domain, such as a set of document with unknown vocabulary.

Lattice questions, based on NL expressions that are generalized into an actual query, abstracting away from individual phrasings. Instead of getting search results which are similar to a given expression (done by 'more like this' query), we first form the commonality expression between all or subsets of the given sample expressions (phrases, sentences), and then use the generalization result as a question. A lattice question includes words as well as attributes such as entity types and verb attributes.

Consider a hospital service request question example:

A junior MRT sale engineer expert travels to hospitals on site;

A junior MRT design expert goes to hospitals and clinics;

A junior MRT software engineer rushes to hospital sites.

Given the above set of samples, the system needs to form a question that would give us cases somewhat similar to what we are looking for. A trivial approach would be to just turn each sample into a question and attempt to find an exact match. However, most of times it would not work, so such questions need to be weakened, release some constraints. How to determine which constraints need to be dropped and which keywords are most important?

To do that, we apply generalization to the set of these samples. For the entities and attributes, we form the least general generalization. The seniority of the job (adjective) 'junior' will stay. The job activity (noun phrase) varies, so we generalize them into <job-activity>. The higher-level reference to the job is 'MRT' and is common for all three cases, so it stays. The verbs for job responsibility vary, so we use <action> that can be further specified as <moving_action>, using verb-focused ontologies like VerbNet. To generalize the last noun phrase, we obtain the generalization <hospital, NP>: junior <any job activity> expert <action> customer-NP.

This is a lattice query, which is expected to be run against job descriptions index and find the cases which are supposed to be most desired, according to the set of samples.

In terms of parse trees of the potential sentences to be matched with the lattice query, we rewrite it as:

JJ-junior NP-* NN-expert VP-* NN-hospital NP-*

The lattice question read as find me a junior something MRT expert doing-something-with a hospital of-something. Now we show how this template can be applied to accept/reject a candidate answer Cisco junior MRT sale representative expert flew to hospital data centers.

The lattice question can be represented as a conjunction of noun phrases (NP) and verb phrases (VP) set:

[[NP [DT-a JJ-junior NN-MRT NN-*], NP [NN*-hospital]],

The first NP covers the beginning of the lattice query above, and the second NP covers the end.

[VP [VB-* TO-to NN*-hospital]]]

VP covers the second half of the lattice query starting from doing-something . . . .

The generalization between the lattice query and a candidate answer is:

[[NP [JJ-junior NN-* NN-*], NP [NN*-hospital]], [VP [VB-* TO-to NN*-hospital]]]

One can see that the NP part is partially satisfied (the article a does not occur in the candidate answer) and VP part is fully satisfied.

Discussion and Conclusions

While exam-style questions are a fundamental educational tool serving a variety of purposes, manual construction of questions is a complex process that requires training, experience, and resources. This, in turn, hinders and slows down the use of educational activities (e.g. providing practice questions) and new advances (e.g. adaptive testing) that require a large pool of questions. To reduce the expenses associated with manual construction of questions and to satisfy the need for a continuous supply of new questions, automatic question generation techniques were introduced.

Developing plausible distractors (wrong answer options) when writing multiple-choice questions is a different problem. Distractors have been described as one of the most challenging and time-consuming parts of the item-writing process. A fully automatic method for generating distractor suggestions for multiple-choice questions used in high-stakes medical exams has been proposed. The system uses a question stem and the correct answer as an input and produces a list of suggested distractors ranked based on their similarity to the stem and the correct answer, combining concept embeddings with information retrieval methods.

Feedback generation concerns the provision of information regarding the response to a question. Feedback is important in reinforcing the benefits of questions especially in electronic environments in which interaction between instructors and students is limited. In addition to informing test takers of the correctness of their responses, feedback plays a role in correcting test takers' errors and misconceptions and in guiding them to the knowledge they must acquire, possibly with reference to additional materials. This aspect of questions has been neglected in early and recent question generation literature. Feedback has been generated, alongside the generated questions, in the form of verbalization of the axioms used to select options. In cases of distractors, axioms used to generate both key and distractors are included in the feedback. In terms of complexity, critical question generation problem is in between question generation and narrative generation.

A linguistic-based relevance technology exists that is based on learning of parse trees for processing, classification and delivery of a stream of texts. The content pipeline for eBay entertainment domain is presented which employs this technology, and show that text processing relevance is the main bottleneck for its performance. A number of components of the content pipeline such as content mining, aggregation, de-duplication, opinion mining, integrity enforcing need to rely on domain-independent efficient text classification, entity extraction and relevance assessment operations.

There is a difference between symptoms reported in formal settings (e.g., EHRs, databases) and informal communities, such as those represented in Web 2.0. There is a comparison of texts written by patients and more formal data source. Specifically, these findings include (1) the widespread use of realtime social networking sites (i.e., Twitter) and short online documentation as the data source for texts written by patients (2) the colloquial nature of symptoms and the diverse nature of language online.

Proposed approach of question construction can be applied to tracking of how health records evolve in time. There continues to be a gap in being able to leverage text mining and NLP to study heterogeneity of symptoms and experiences. The review revealed that Twitter was the online community most frequently used to access and study symptom-related patient records. The studies that used Twitter largely focused on pharmacological vigilance and assessment of public health outbreaks. Posts made by users on Twitter are termed "tweets" and are limited to 140 (more recently 280) characters. In contrast to other textual sources of patient symptom information, such as clinical notes within electronic health records (which are typically much longer in length and can be limited by reporting lags), the short length of tweets in combination with real-time, interactive posting of online communities, has the potential to facilitate immediate, scalable access for pharmaceutical companies and governmental agencies, like the Centers for Disease Control or Federal Drug Administration, to monitor changes in symptoms. This access could have significant implications for examining the recent opioid crisis and patient management of pain. Of note, over 85% of studies included in our review included mentions of terms Deduction to build inference chains of words. Human reasoning over language (natural language inference, NLI) is not always deductive. In particular, NLI is capable of performance an unsupported inference that humans can typically do. However, relying on a precise model of inference all of a rule's conditions have to be proved true for the conclusion to be inferred. A trained inference chain model is still quite far from what is required for fully natural reasoning over NL. The desired feature of a trained inference chain model is to jump through gaps in the explicitly provided knowledge, providing the missing knowledge is natural, obvious and lacks contradictions with the explicitly provided facts. It can be possibly achieved by leveraging its pretrained knowledge. Regretfully, there is a conflict between the model's treatment of negation as failure and an intuitions about NLI. For example, given (just) 'If a patient is tired then he is not moving' the model will conclude (given nothing else) that 'he cannot move' as it cannot prove that 'he is not tired'.

Asking questions to fill the gaps in required knowledge is an important and complex form of intellectual activity of humans. This problem of inventing critical questions turns out to be much more difficult than deriving questions from text such that this text naturally answers them. As we attempt to automate it, we encounter a series of problems in reasoning and computational linguistics all of which are necessary to solve to build a robust and flexible question generation system. Our evaluation shows that acquiring missing knowledge by asking questions for information outside of available texts is an efficient way to support decision making and decision support in such domain as health.

Exemplary Computing Systems

Figure 7:
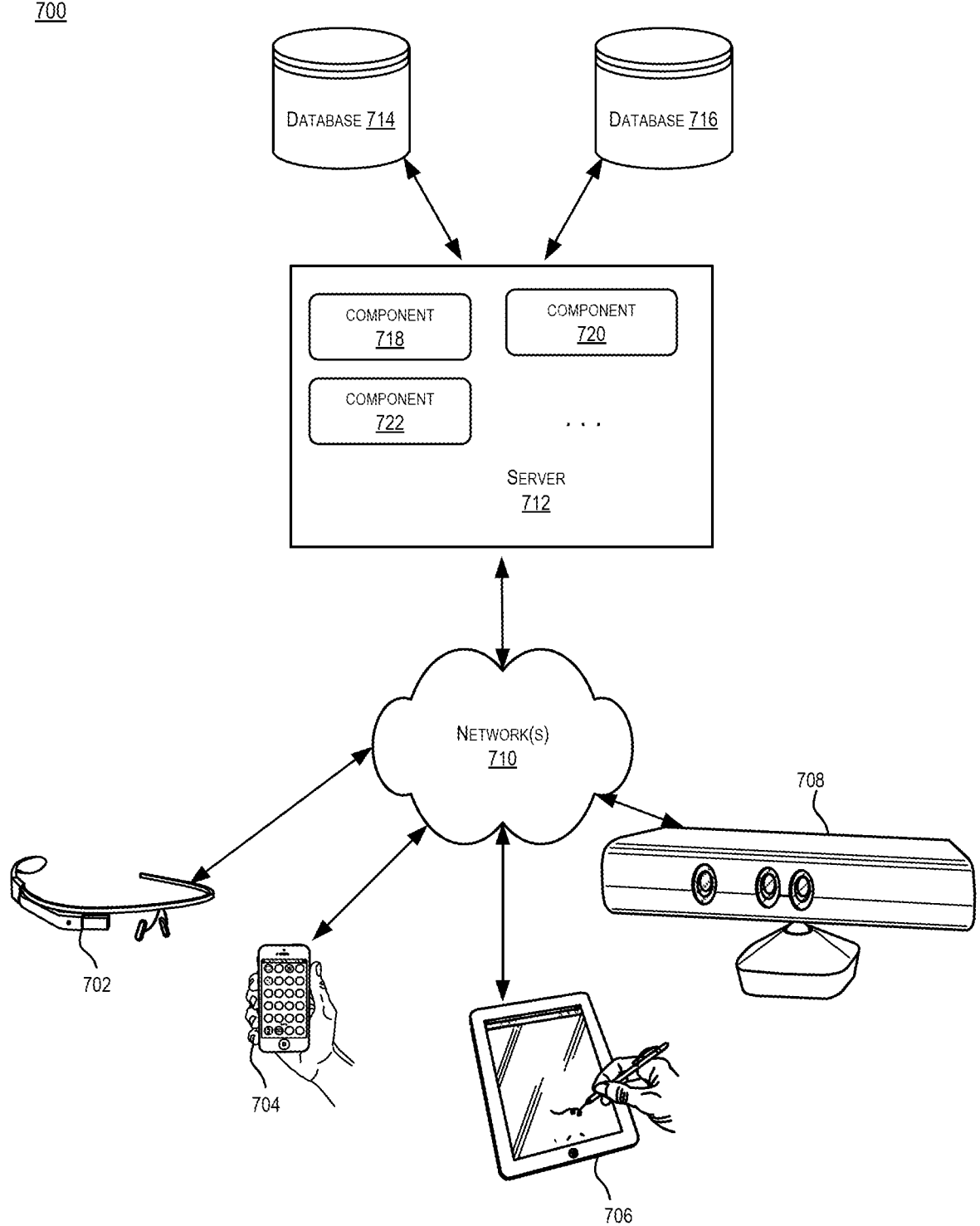
FIG. 7 depicts a simplified diagram of a distributed system for implementing one of the aspects.

FIG. 7 depicts a simplified diagram of a distributed system 700 for implementing one of the aspects. In the illustrated aspect, distributed system 700 includes one or more client computing devices 702, 704, 706, and 708, which are configured to execute and operate a client application such as a web browser, proprietary client (e.g., Oracle Forms), or the like over one or more network(s) 710. Server 712 may be communicatively coupled with remote client computing devices 702, 704, 706, and 708 via network 710.

In various aspects, server 712 may be adapted to run one or more services or software applications provided by one or more of the components of the system. The services or software applications can include non-virtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in the figure, the software components 718, 720 and 722 of system 700 are shown as being implemented on server 712. In other aspects, one or more of the components of distributed system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The aspect shown in the figure is thus one example of a distributed system for implementing an aspect system and is not intended to be limiting.

Client computing devices 702, 704, 706, and/or 708 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 702, 704, 706, and 708 may be any other electronic device, such as a thin-client computer, an Internet-enabled gaming system (e.g., a Microsoft Xbox gaming console with or without a Kinect® gesture input device), and/or a personal messaging device, capable of communicating over network(s) 710.

Although exemplary distributed system 700 is shown with four client computing devices, any number of client computing devices may be supported. Other devices, such as devices with sensors, etc., may interact with server 712.

Network(s) 710 in distributed system 700 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 710 can be a local area network (LAN), such as one based on Ethernet, Token-Ring and/or the like. Network(s) 710 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.7 suite of protocols, Bluetooth®, and/or any other wireless protocol); and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 can include one or more virtual machines running virtual operating systems, or other computing architectures involving virtualization. One or more flexible pools of logical storage devices can be virtualized to maintain virtual storage devices for the server. Virtual networks can be controlled by server 712 using software defined networking. In various aspects, server 712 may be adapted to run one or more services or software applications described in the foregoing disclosure. For example, server 712 may correspond to a server for performing processing described above according to an aspect of the present disclosure.

Server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more databases 714 and 716. Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of aspects, databases 714 and 716 may reside in a storage-area network (SAN). Similarly, any necessary files for performing the functions attributed to server 712 may be stored locally on server 712 and/or remotely, as appropriate. In one set of aspects, databases 714 and 716 may include relational databases, such as databases provided by Oracle, that are adapted to store, update, and retrieve data in response to SQL-formatted commands.

Figure 8:
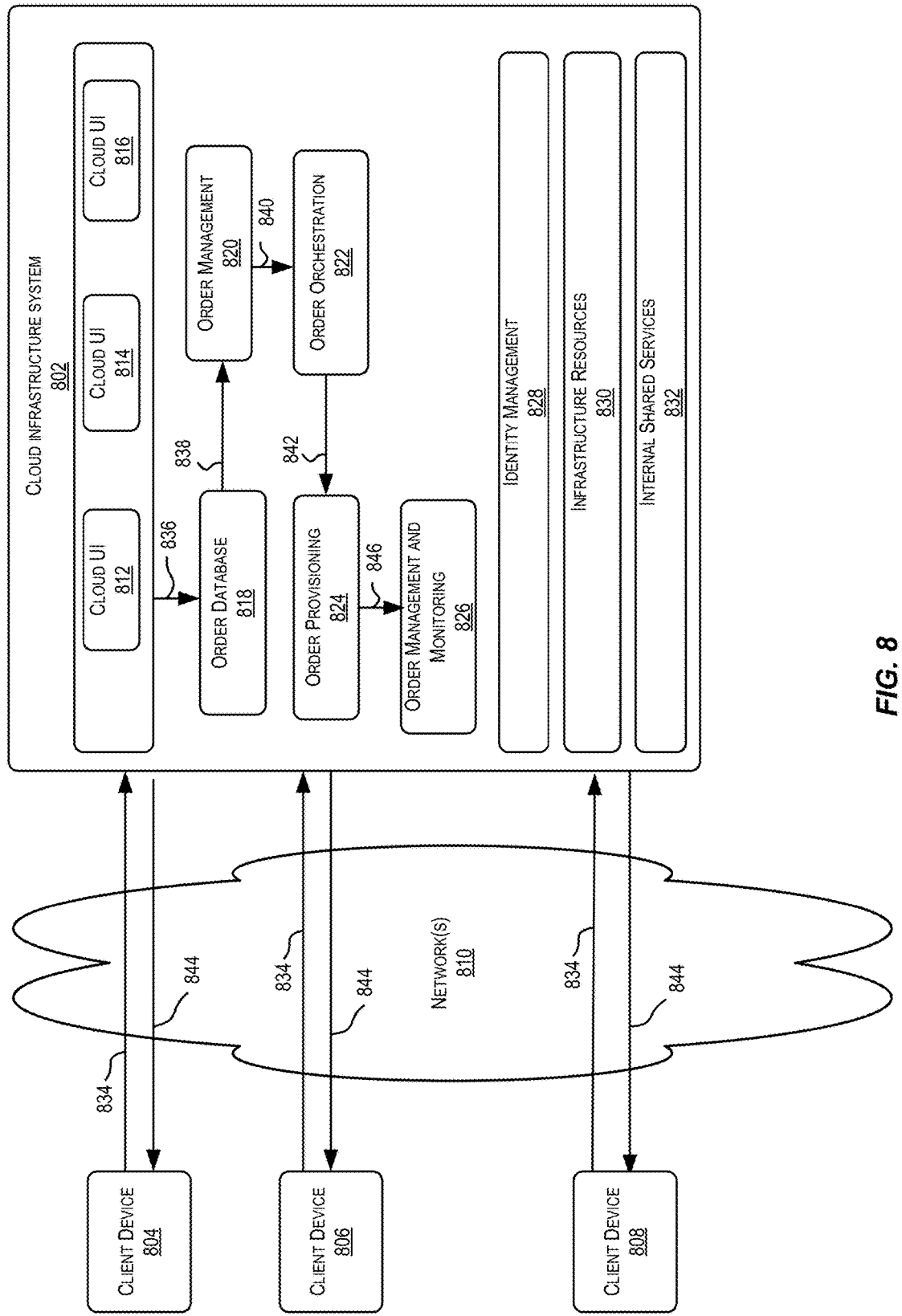
FIG. 8 is a simplified block diagram of components of a system environment by which services provided by the components of an aspect system may be offered as cloud services in accordance with an aspect.

FIG. 8 is a simplified block diagram of one or more components of a system environment 800 by which services provided by one or more components of an aspect system may be offered as cloud services in accordance with an aspect of the present disclosure. In the illustrated aspect, system environment 800 includes one or more client computing devices 804, 806, and 808 that may be used by users to interact with a cloud infrastructure system 802 that provides cloud services. The client computing devices may be configured to operate a client application such as a web browser, a proprietary client application (e.g., Oracle Forms), or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the aspect shown in the figure is only one example of a cloud infrastructure system that may incorporate an aspect of the invention. In some other aspects, cloud infrastructure system 802 may have more or fewer components than shown in the figure, may combine two or more components, or may have a different configuration or arrangement of components.

Client computing devices 804, 806, and 808 may be devices similar to those described above for 702, 704, 706, and 708.

Although exemplary system environment 800 is shown with three client computing devices, any number of client computing devices may be supported. Other devices such as devices with sensors, etc. may interact with cloud infrastructure system 802.

Network(s) 810 may facilitate communications and exchange of data between client computing devices 804, 806, and 808 and cloud infrastructure system 802. Each network may be any type of network familiar to those skilled in the art that can support data communications using any of a variety of commercially-available protocols, including those described above for network(s) 710.

Cloud infrastructure system 802 may comprise one or more computers and/or servers that may include those described above for server 712.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some aspects, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some aspects, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 802 may also include infrastructure resources 830 for providing the resources used to provide various services to customers of the cloud infrastructure system. In one aspect, infrastructure resources 830 may include pre-integrated and optimized combinations of hardware, such as servers, storage, and networking resources to execute the services provided by the PaaS platform and the SaaS platform.

In some aspects, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 802 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 802, and the like.

In one aspect, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In exemplary operation 834, a customer using a client device, such as client computing device 804, 806 or 808, may interact with cloud infrastructure system 802 by requesting one or more services provided by cloud infrastructure system 802 and placing an order for a subscription for one or more services offered by cloud infrastructure system 802. In certain aspects, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816.

At operation 836, the order is stored in order database 818. Order database 818 can be one of several databases operated by cloud infrastructure system 802 and operated in conjunction with other system elements.

At operation 838, the order information is forwarded to an order management module 820. In some instances, order management module 820 may be configured to perform billing and accounting functions related to the order, such as verifying the order, and upon verification, booking the order.

At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain aspects, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client computing devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain aspects, cloud infrastructure system 800 may include an identity management module 828. Identity management module 828 may be configured to provide identity services, such as access management and authorization services in cloud infrastructure system 800. In some aspects, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

Figure 9:
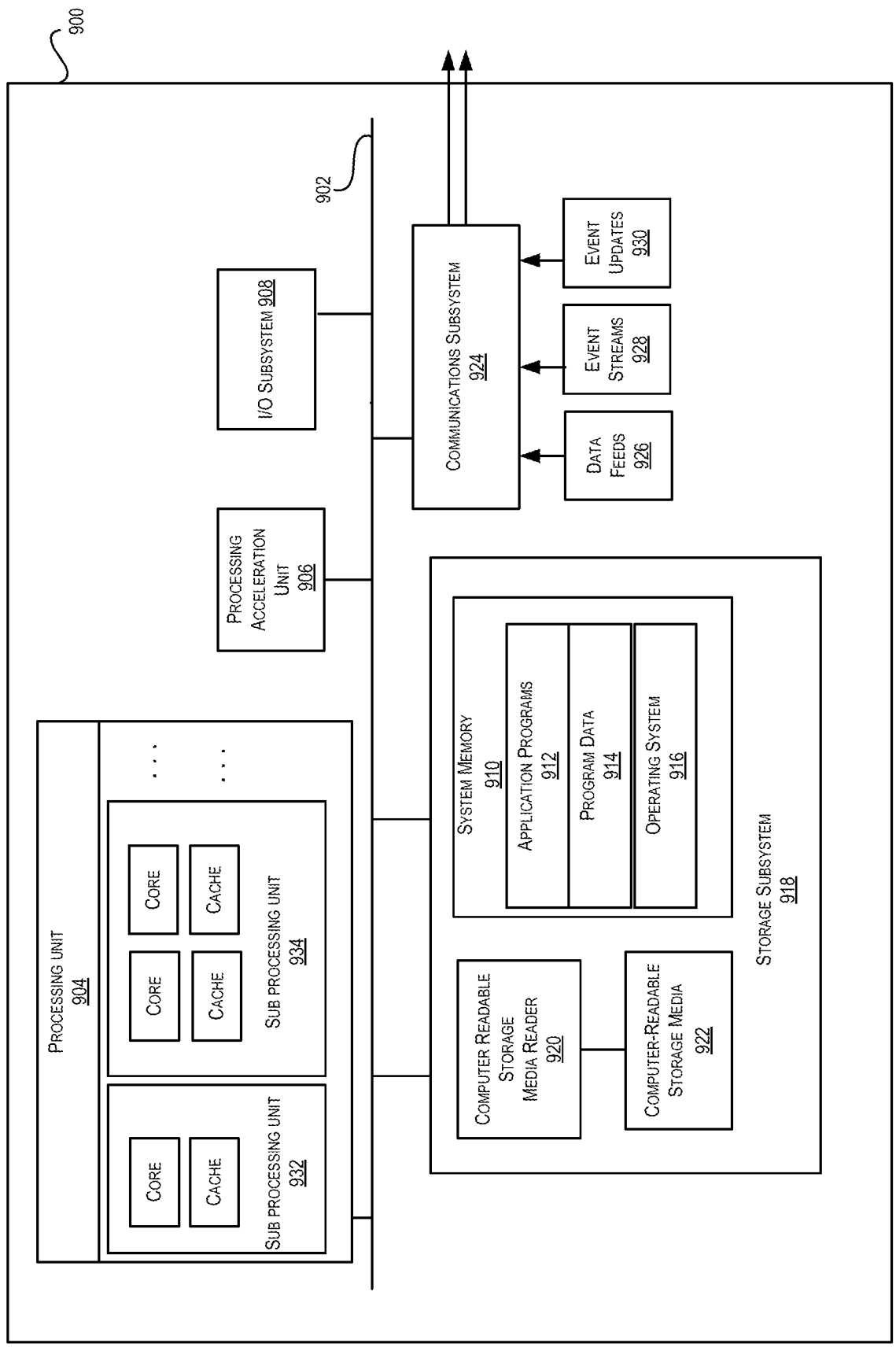
FIG. 9 illustrates an exemplary computer system, in which various aspects of the present invention may be implemented.

FIG. 9 illustrates an exemplary computer system 900, in which various aspects of the present invention may be implemented. The computer system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative aspects of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P986.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain aspects, processing unit 904 may be implemented as one or more independent processing units 932 and/or 934 with single or multicore processors included in each processing unit. In other aspects, processing unit 904 may also be implemented as a quad-core processing unit formed by integrating two dual-core processors into a single chip.

In various aspects, processing unit 904 can execute a variety of programs in response to program code and can maintain multiple concurrently executing programs or processes. At any given time, some or all of the program code to be executed can be resident in processing unit 904 and/or in storage subsystem 918. Through suitable programming, processing unit 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 918 may also provide a tangible computer-readable storage medium for storing the basic programming and data constructs that provide the functionality of some aspects. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with the present invention.

Storage subsystem 918 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computer system 900.

By way of example, computer-readable storage media 922 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some aspects, communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.28 family standards, or other mobile communication technologies, or any combination thereof), global positioning system (GPS) receiver components, and/or other components. In some aspects, communications subsystem 924 can provide wired network connectivity (e.g., Ethernet) in addition to or instead of a wireless interface.

In some aspects, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive unstructured data feeds 926 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 99, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 99, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various features and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A method of generating questions from textual sources, the method comprising:
    forming a first semantic tree from a first reference text and second semantic tree from a second reference text, wherein each semantic tree comprises nodes and edges, wherein each node represents a role of a corresponding entity, and wherein each edge represents a relationship between two entities;
    identifying, from the first semantic tree and the second semantic tree, a set of semantic nodes that are (i) in the first semantic tree and (ii) not in the second semantic tree;
    forming a first syntactic tree for the first reference text and a second syntactic tree for the second reference text, wherein each syntactic tree comprises terminal nodes that represent words and syntactic nodes that represent syntactic categories;
    identifying, from the first syntactic tree and the second syntactic tree, a set of syntactic nodes that are in the first syntactic tree but not in the second syntactic tree, the set of syntactic nodes being identified based at least in part on providing the first syntactic tree and the second syntactic tree to a machine-learning model as input, the machine-learning model being previously trained to identify common syntactic nodes between two syntactic trees provided as input;
    mapping the set of semantic nodes to the set of syntactic nodes by identifying a correspondence between a first node in the set of semantic nodes and a second node in the set of syntactic nodes, wherein the first node and the second node are associated with a normalized word;
    forming a question fragment from the normalized word; and
    providing the question fragment to a user device.

2. The method of claim 1, wherein identifying the set of semantic nodes comprises:
    identifying, between the first semantic tree and the second semantic tree, a semantic maximal common subtree that comprises a maximum number of (a) nodes, each node representing a common entity that is common between the first semantic tree and the second semantic tree and (b) edges between the nodes that represent a semantic relationship between two or more of the common entities; and
    removing, from the first semantic tree, nodes that are in the semantic maximal common subtree.

3. The method of claim 1, wherein identifying the set of syntactic nodes comprises:
    removing, from the first syntactic tree, a set of nodes identified by the machine-learning model as being common to the first syntactic tree and the second syntactic tree.

4. The method of claim 1, wherein forming the question fragment comprises:
    identifying that the normalized word represents either (i) a noun, (ii) a verb, (iii) an adjective, or (iv) an adverb; and
    replacing the normalized word with a question word, wherein the question word is one of (i) what, (ii) where, (iii) whom, (iv) who, or (v) how.

5. The method of claim 4, wherein identifying that the normalized word represents either the noun, the verb, the adjective, or the adverb comprises constructing an additional syntactic tree from one or more of text associated with the normalized word, the set of semantic nodes, and the set of syntactic nodes, wherein the additional syntactic tree comprises additional nodes.

6. The method of claim 1, wherein forming the question fragment comprises:
    extracting a candidate question fragment from text associated with the normalized word;
    identifying a level of similarity between the candidate question fragment and a text fragment template; and
    responsive to determining that the level of similarity is greater than a threshold, identifying the candidate question fragment as the question fragment.

7. The method of claim 1, further comprising:
    receiving, from the user device, a response to the question fragment; and
    updating an entry in an ontology based on the response.

8. A system comprising:
    a non-transitory computer-readable medium storing computer-executable program instructions; and
    a processing device communicatively coupled to the non-transitory computer-readable medium for executing the computer-executable program instructions, wherein executing the computer-executable program instructions configures the processing device to perform operations comprising:
        forming a first semantic tree from a first reference text and second semantic tree from a second reference text, wherein each semantic tree comprises nodes and edges, wherein each node represents a role of a corresponding entity, and wherein each edge represents a relationship between two entities;
        identifying, from the first semantic tree and the second semantic tree, a set of semantic nodes that are (i) in the first semantic tree and (ii) not in the second semantic tree;
        forming a first syntactic tree for the first reference text and a second syntactic tree for the second reference text, wherein each syntactic tree comprises terminal nodes that represent words and syntactic nodes that represent syntactic categories;
        identifying, from the first syntactic tree and the second syntactic tree, a set of syntactic nodes that are in the first syntactic tree but not in the second syntactic tree, the set of syntactic nodes being identified based at least in part on providing the first syntactic tree and the second syntactic tree to a machine-learning model as input, the machine-learning model being previously trained to identify common syntactic nodes between two syntactic trees provided as input;
        mapping the set of semantic nodes to the set of syntactic nodes by identifying a correspondence between a first node in the set of semantic nodes and a second node in the set of syntactic nodes, wherein the first node and the second node are associated with a normalized word;

forming a question fragment from the normalized word; and providing the question fragment to a user device.

9. The system of claim 8, wherein identifying the set of semantic nodes comprises:

identifying, between the first semantic tree and the second semantic tree, a semantic maximal common subtree that comprises a maximum number of (a) nodes, each node representing a common entity that is common between the first semantic tree and the second semantic tree and (b) edges between the nodes that represent a semantic relationship between two or more of the common entities; and removing, from the first semantic tree, nodes that are in the semantic maximal common subtree.

10. The system of claim 8, wherein identifying the set of syntactic nodes comprises:

removing, from the first syntactic tree, a set of nodes identified by the machine-learning model as being common to the first syntactic tree and the second syntactic tree.

11. The system of claim 8, wherein forming the question fragment comprises:

identifying that the normalized word represents either (i) a noun, (ii) a verb, (iii) adjective, or (iv) adverb; and replacing the normalized word with a question word, wherein the question word is one of (i) what, (ii) where, (iii) whom, (iv) who, or (v) how.

12. The system of claim 11, wherein identifying that the normalized word represents either the noun, the verb, the adjective, or the adverb comprises constructing an additional syntactic tree from one or more of text associated with the normalized word, the set of semantic nodes, and the set of syntactic nodes, wherein the additional syntactic tree comprises additional nodes.

13. The system of claim 8, wherein forming the question fragment comprises:

extracting a candidate question fragment from text associated with the normalized word;

identifying a level of similarity between the candidate question fragment and a text fragment template; and responsive to determining that the level of similarity is greater than a threshold, identifying the candidate question fragment as the question fragment.

14. A non-transitory computer-readable storage medium storing computer-executable program instructions that, when executed by a processing device, causes the processing device to perform operations comprising:

forming a first semantic tree from a first reference text and second semantic tree from a second reference text, wherein each semantic tree comprises nodes and edges, wherein each node represents a role of a corresponding entity, and wherein each edge represents a relationship between two entities;

identifying, from the first semantic tree and the second semantic tree, a set of semantic nodes that are (i) in the first semantic tree and (ii) not in the second semantic tree;

forming a first syntactic tree for the first reference text and a second syntactic tree for the second reference text, wherein each syntactic tree comprises terminal nodes that represent words and syntactic nodes that represent syntactic categories;

identifying, from the first syntactic tree and the second syntactic tree, a set of syntactic nodes that are in the first syntactic tree but not in the second syntactic tree, the set of syntactic nodes being identified based at least in part on providing the first syntactic tree and the second syntactic tree to a machine-learning model as input, the machine-learning model being previously trained to identify common syntactic nodes between two syntactic trees provided as input;

mapping the set of semantic nodes to the set of syntactic nodes by identifying a correspondence between a first node in the set of semantic nodes and a second node in the set of syntactic nodes, wherein the first node and the second node are associated with a normalized word;

forming a question fragment from the normalized word; and providing the question fragment to a user device.

15. The non-transitory computer-readable storage medium of claim 14, wherein identifying the set of semantic nodes comprises:

identifying, between the first semantic tree and the second semantic tree, a semantic maximal common subtree that comprises a maximum number of (a) nodes, each node representing a common entity that is common between the first semantic tree and the second semantic tree and (b) edges between the nodes that represent a semantic relationship between two or more of the common entities; and removing, from the first semantic tree, nodes that are in the semantic maximal common subtree.

16. The non-transitory computer-readable storage medium of claim 14, wherein identifying the set of syntactic nodes comprises:

removing, from the first syntactic tree, a set of nodes identified by the machine-learning model as being common to the first syntactic tree and the second syntactic tree.

17. The non-transitory computer-readable storage medium of claim 14, wherein forming the question fragment comprises:

identifying that the normalized word represents either (i) a noun, (ii) a verb, (iii) adjective, or (iv) adverb; and replacing the normalized word with a question word, wherein the question word is one of (i) what, (ii) where, (iii) whom, (iv) who, or (v) how.

18. The non-transitory computer-readable storage medium of claim 17, wherein identifying that the normalized word represents either the noun, the verb, the adjective, or the adverb comprises constructing an additional syntactic tree from one or more of text associated with the normalized word, the set of semantic nodes, and the set of syntactic nodes, wherein the additional syntactic tree comprises additional nodes.

19. The non-transitory computer-readable storage medium of claim 14, wherein forming the question fragment comprises:

extracting a candidate question fragment from text associated with the normalized word;

identifying a level of similarity between the candidate question fragment and a text fragment template; and responsive to determining that the level of similarity is greater than a threshold, identifying the candidate question fragment as the question fragment.

20. The non-transitory computer-readable storage medium of claim 14, wherein executing the computer-executable program instructions further causes the processing device to perform additional operations comprising:

receiving, from the user device, a response to the question fragment; and updating an entry in an ontology based on the response.

\* \* \* \* \*

UNITED STATES PATENT AND TRADEMARK OFFICE
CERTIFICATE OF CORRECTION

PATENT NO. : 11,914,965 B2
APPLICATION NO. : 17/389914
DATED : February 27, 2024
INVENTOR(S) : Galitsky Page 1 of 1

It is certified that error appears in the above-identified patent and that said Letters Patent is hereby corrected as shown below:

In the Specification

In Column 13, Line 37, delete "intelligent)?" and insert -- intelligent,)? --, therefor.

In Column 13, Lines 45-46, delete "{woman(_, _), man(ugly, _), man(dumb, _)}." and insert -- {woman(,_, _), man(ugly, _,), man(,dumb, _)}. --, therefor.

In Column 13, Line 53, delete "G={man(ugly,tall),man(dumb,small)}" and insert -- G={man(ugly,,tall),man(,dumb,small)} --, therefor.

Signed and Sealed this
Ninth Day of July, 2024

Katherine Kelly Vidal
*Director of the United States Patent and Trademark Office*